US012580757B2

(12) United States Patent
Fukuda et al.

(10) Patent No.: US 12,580,757 B2
(45) Date of Patent: Mar. 17, 2026

(54) MATCHING SYSTEM, KEY GENERATION APPARATUS, MATCHING APPARATUS, FIRST TRANSFORMATION APPARATUS, SECOND TRANSFORMATION APPARATUS, AND METHODS THEREOF

(71) Applicant: NEC Corporation, Tokyo (JP)

(72) Inventors: Haruna Fukuda, Tokyo (JP); Toshiyuki Isshiki, Tokyo (JP); Kengo Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/722,644

(22) PCT Filed: Dec. 27, 2021

(86) PCT No.: PCT/JP2021/048720
§ 371 (c)(1),
(2) Date: Jun. 21, 2024

(87) PCT Pub. No.: WO2023/127068
PCT Pub. Date: Jul. 6, 2023

(65) Prior Publication Data
US 2025/0070967 A1 Feb. 27, 2025

(51) Int. Cl.
*H04L 9/08* (2006.01)
(52) U.S. Cl.
CPC .................................. *H04L 9/0869* (2013.01)
(58) Field of Classification Search
CPC ....................................................... H04L 9/08
See application file for complete search history.

(56) References Cited

U.S. PATENT DOCUMENTS 10,484,182 B2 * 11/2019 Isshiki ...................... H04L 9/14
11,533,176 B2 * 12/2022 Takashima ............ H04L 9/0869
(Continued)

FOREIGN PATENT DOCUMENTS

JP 2009-129292 A 6/2009
JP 2009-272995 A 11/2009
(Continued)

OTHER PUBLICATIONS

International Search Report for PCT Application No. PCT/JP2021/048720, mailed on Mar. 15, 2022.
(Continued)

*Primary Examiner* — Chau Le
(74) *Attorney, Agent, or Firm* — Sughrue Mion, PLLC

(57) ABSTRACT

A matching system includes a key generation apparatus that generates a registration key matrix, generates a matching key matrix, and generates an auxiliary key matrix from a matrix product of registration key matrix and the matching key matrix; a first transformation apparatus that generates a registered feature vector from registered information input, and generates a registered concealed vector by calculating a product of the registered feature vector and registration key matrix received from the key generation apparatus; a second transformation apparatus that generates a matching feature vector from matching information input, and generates a matching concealed vector by calculating a product of the matching feature vector and the matching key matrix received from the key generation apparatus; and a matching apparatus that matches the registered information and the matching information by calculating a vector-matrix product of the registered concealed vector, the matching concealed vector and the auxiliary key matrix.

20 Claims, 7 Drawing Sheets

(56) References Cited

U.S. PATENT DOCUMENTS

| | | | |
|---|---|---|---|
| 2008/0037833 A1 | 2/2008 | Takahashi et al. | |
| 2009/0279694 A1 | 11/2009 | Takahashi et al. | |
| 2010/0091986 A1* | 4/2010 | Wakayama | H04L 9/0869 |
| | | | 380/28 |
| 2010/0106964 A1* | 4/2010 | Hirata | H04L 63/0861 |
| | | | 726/5 |
| 2010/0205658 A1* | 8/2010 | Griffin | G06F 21/32 |
| | | | 726/5 |
| 2011/0314285 A1* | 12/2011 | Hirata | H04L 63/0861 |
| | | | 713/170 |
| 2013/0088327 A1* | 4/2013 | Takahashi | H04L 9/3228 |
| | | | 340/5.82 |
| 2017/0109852 A1 | 4/2017 | Ito | |
| 2019/0394039 A1 | 12/2019 | Higo et al. | |
| 2022/0343691 A1 | 10/2022 | Nakachi et al. | |
| 2024/0273173 A1* | 8/2024 | Isshiki | H04L 9/088 |

FOREIGN PATENT DOCUMENTS

| | | |
|---|---|---|
| JP | 2011-118452 A | 6/2011 |
| JP | 4929136 B2 | 5/2012 |
| JP | 4961214 B2 | 6/2012 |
| WO | 2015/151155 A1 | 10/2015 |
| WO | 2018/110608 A1 | 6/2018 |
| WO | 2020/246010 A1 | 12/2020 |

OTHER PUBLICATIONS

Y. Saito, I. Nakamura, S. Shiota and H. Kiya, "An Efficient Random Unitary Matrix for Biometric Template Protection," 2016 Joint 8th International Conference on Soft Computing and Intelligent Systems (SCIS) and 17th International Symposium on Advanced Intelligent Systems (ISIS), 2016, pp. 366-.

Higo, Haruna et al., "A Secure Biometric Authentication Scheme with Small Information Disclosure", 2016 Symposium on Cryptography and Information Security (SCIS2016), Jan. 22, 2016.

Higo, Haruna et al., "Cancelable Biometrics based on Euclidean distance", 2022 Symposium on Cryptography and Information Security (SCIS2022).

Ikeno, Shinichi et al., "Gendai Ango Riron" 1st edition.

International Search Report for PCT Application No. PCT/JP2021/048720, mailed Mar. 15, 2022.

* cited by examiner

FIG. 7

MATCHING SYSTEM, KEY GENERATION APPARATUS, MATCHING APPARATUS, FIRST TRANSFORMATION APPARATUS, SECOND TRANSFORMATION APPARATUS, AND METHODS THEREOF

This application is a National Stage Entry of PCT/JP2021/048720 filed on Dec. 27, 2021, the contents of all of which are incorporated herein by reference, in their entirety.

FIELD

The present invention relates to a matching system, a key generation apparatus, a matching apparatus, a first transformation apparatus, a second transformation apparatus, and methods thereof.

BACKGROUND

Biometric authentication is an example of personal authentication. The Biometric authentication is a personal authentication technique that verifies whether or not a person to be authenticated matches a registered person by comparing biometric information of the person to be authenticated with that of the registered person. Here, the biometric information is data extracted from some characteristics of an individual with respect to his or her body and behavior. For example, the biometric information includes extracted features from images such as fingerprints or palm prints, as well as features extracted from audio data like voiceprints.

In biometric authentication, the biometric information of a person to be authenticated is registered in advance, and at the time of authentication, it is verified whether or not the registered biometric information and the biometric information of the person to be authenticated match. In this case, the biometric information must be managed in highly secure manner. This is because since the biometric information is also personal information, the leak itself is harmful, and since the biometric information cannot be destroyed or updated when it is leaked, the security of all authentication systems that use the same biometric information will be lost. Therefore, as protection criteria for biometric information, it is required that the original biometric information cannot be obtained even by the server administrator, and that the registered biometric information can be invalidated.

One matching scheme that satisfies these requirements is cancelable biometrics. The cancelable biometrics is a scheme for matching extracted features from a biological body, in a transformed state. In the cancelable biometrics, at a time of registration, a transformation $T \leftarrow FK(x)$ is performed on feature x using a registration key K. At a time of matching, a transformation $T' \leftarrow GK'(x)$ is performed on feature y using a matching key K'. Then, the matching between the feature x and y is performed by matching the transformed T and T'.

By adopting such a scheme, according to the cancelable biometrics, it is possible to invalidate (cancel) a registered data and update it with a new registered data by changing the registration key K and the matching key K'. In addition, since the registered data and/or the matching data are obtained by transforming features using keys, even a server administrator cannot obtain the original biometric information as long as the transformation is sufficiently unidirectional. This means that it has a property suitable for biometric authentication. Various schemes of such cancelable biometrics are known (see, for example, Patent Literatures (PTLs) 1 and 2 and Non-Patent Literature (NPL) 1).

[PTL 1] Japanese Patent No. 4961214
[PTL 2] Japanese Patent No. 4929136
[NPL 1] Y. Saito, I. Nakamura, S. Shiota and H. Kiya, "An Efficient Random Unitary Matrix for Biometric Template Protection," 2016 Joint 8th International Conference on Soft Computing and Intelligent Systems (SCIS) and 17th International Symposium on Advanced Intelligent Systems (ISIS), 2016, pp. 366-370

SUMMARY

Each disclosure of the literatures in Citation List above is incorporated herein in its entirety by reference thereto. The following analysis is given by the present inventors.

More security is also required for the cancellable biometrics scheme. One of reasons for this is that unidirectionality of transformation is insufficient for some cancelable biometrics in the prior art. If the transformation is unidirectional, original features cannot be uniquely identified from the registered data or the matching data. However, there is a possibility that the registered data and/or the matching data leak(s) information about the original features. In such cases, it has the vulnerability that the original features can be inferred from the registered data and/or the matching data.

It is also possible that a pair of registered data and/or the matching data and the original features may be leaked. In such a case, the registration key or the matching key may be estimated from the pair of registered data and/or matching data and original features. It is preferable that security is ensured even if the pair of registered data and/or matching data and original features is leaked. In addition, in general cancelable biometrics a registration key is often used as a matching key. This means that if either the registration key or the matching key leaks, the other key will also leak.

In view of the above-mentioned problems, it is an object of the present invention to provide a matching system, a key generation apparatus, a matching apparatus, a first transformation apparatus, a second transformation apparatus, and methods thereof, which contribute to improve security of the cancellable biometrics.

Solution to Problem

According to a first aspect of the present invention, there is provided a matching system, comprising:

a key generation apparatus that generates a first regular matrix selected at random as a registration key matrix, generates a second regular matrix selected at random as a matching key matrix, and generates an auxiliary key matrix from a matrix product of the registration key matrix and the matching key matrix;

a first transformation apparatus that generates a registered feature vector from registered information input, and generates a registered concealed vector by calculating a product of the registered feature vector and the registration key matrix received from the key generation apparatus;

a second transformation apparatus that generates a matching feature vector from matching information input, and generates a matching concealed vector by calculating a product of the matching feature vector and the matching key matrix received from the key generation apparatus; and a matching apparatus that matches the registered information and the matching information by calculating a vector-matrix product of the registered concealed vector, the matching concealed vector and the auxiliary key matrix, the registered concealed vector being received from the first transformation apparatus, the matching concealed vector being received from the second transformation apparatus, and the auxiliary key matrix being received from the key generation apparatus.

According to a second aspect of the present invention, there is provided a key generation apparatus that generates a key for matching a registered information and a matching information using a first transformation apparatus, a second transformation apparatus, and a matching apparatus, the first transformation apparatus generating a registered feature vector from the registered information input, and generating a registered concealed vector by calculating a product of the registered feature vector and a registration key matrix received from the key generation apparatus, the second transformation apparatus generating a matching feature vector from the matching information input, and generating a matching concealed vector by calculating a product of the matching feature vector and a matching key matrix received from the key generation apparatus, the matching apparatus calculating a vector-matrix product of the registered concealed vector, the matching concealed vector and an auxiliary key matrix, the registered concealed vector being received from the first transformation apparatus, and the matching concealed vector being received from the second transformation apparatus, wherein the key generation apparatus generates a first regular matrix selected at random as the registration key matrix, generates a second regular matrix selected at random as the matching key matrix, and generates an auxiliary key matrix from a matrix product of the registration key matrix and the matching key matrix.

According to a third aspect of the present invention, there is provided a matching apparatus that matches registered information and matching information using a key generation apparatus, a first transformation apparatus, and a second transformation apparatus, the key generation apparatus generating a registration key, a matching key and an auxiliary key, the first transformation apparatus generating a registered feature vector from the registered information input, and generating a registered concealed vector by calculating a product of the registered feature vector and a registration key matrix received from the key generation apparatus, and the second transformation apparatus generating a matching feature vector from the matching information input, and generating a matching concealed vector by calculating a product of the matching feature vector and a matching key matrix received from the key generation apparatus, wherein the matching apparatus calculates matching result of matching the registered information and the matching information from the registered concealed vector, the matching concealed vector and the auxiliary key matrix, the registered concealed vector being received from the first transformation apparatus, the matching concealed vector being received from the second transformation apparatus, and the auxiliary key matrix being received from the key generation apparatus.

According to a fourth aspect of the present invention, there is provided a matching apparatus that matches registered information and matching information using a key generation apparatus, a first transformation apparatus, and a second transformation apparatus, the key generation apparatus generating a first regular matrix selected at random as a registration key matrix, generating a second regular matrix selected at random as a matching key matrix, and generating an auxiliary key matrix from a matrix product of the registration key matrix and the matching key matrix; the first transformation apparatus generating a registered feature vector from the registered information input, and generating a registered concealed vector by calculating a product of the registered feature vector and the registration key matrix received from the key generation apparatus; and the second transformation apparatus generating a matching feature vector from matching information input, and generating a matching concealed vector by calculating a product of the matching feature vector and the matching key matrix received from the key generation apparatus, wherein the matching apparatus matches the registered information and the matching information by calculating a vector-matrix product of the registered concealed vector, the matching concealed vector and the auxiliary key matrix, the registered concealed vector being received from the first transformation apparatus, the matching concealed vector being received from the second transformation apparatus, and the auxiliary key matrix being received from the key generation apparatus.

According to a fifth aspect of the present invention, there is provided a first transformation apparatus that registers a registered conceal vector to a matching apparatus for a matching method using a key generation apparatus, a second transformation apparatus, and the matching apparatus, the key generation apparatus generating a first regular matrix selected at random as a registration key matrix, generating a second regular matrix selected at random as a matching key matrix, and generating an auxiliary key matrix from a matrix product of the registration key matrix and the matching key matrix, the second transformation apparatus generating a matching feature vector from matching information input, and generating a matching concealed vector by calculating a product of the matching feature vector and the matching key matrix received from the key generation apparatus, the matching apparatus calculating a vector-matrix product of the matching concealed vector a registered concealed vector, and the auxiliary key matrix, the matching concealed vector being received from the second transformation apparatus and the auxiliary key matrix being received from the key generation apparatus, wherein the first transformation apparatus generates a registered feature vector from the registered information input, generates the registered concealed vector by calculating a product of the registered feature vector and the registration key matrix received from the key generation apparatus, and transmits the registered concealed vector to the matching apparatus.

According to a sixth aspect of the present invention, there is provided a second transformation apparatus that transmits a matching concealed vector to a matching apparatus for a matching method using a key generation apparatus, a first transformation apparatus, and the matching apparatus, the key generation apparatus generating a first regular matrix selected at random as a registration key matrix, generating a second regular matrix selected at random as a matching key matrix, and generating an auxiliary key matrix from a matrix product of the registration key matrix and the matching key matrix, the first transformation apparatus generating a registered feature vector from the registered information input, and generating a registered concealed vector by calculating a product of the registered feature vector and the registration key matrix received from the key generation apparatus, the matching apparatus calculating a vector-matrix product of the registered concealed vector, the matching concealed vector input and the auxiliary key matrix, the registered concealed vector being received from the first transformation apparatus and the auxiliary key matrix being received from the key generation apparatus, wherein the second transformation apparatus generates a matching feature vector from matching information input, generates the matching concealed vector by calculating a product of the matching feature vector and the matching key matrix received from the key generation apparatus, and transmits the matching concealed vector to the matching apparatus.

According to a seventh aspect of the present invention, there is provided a method for matching registered information input to a first transformation apparatus and matching information input to a second transformation apparatus using a key distributed by a key generation apparatus, comprising:

generating a first regular matrix selected at random as a registration key matrix by the key generation apparatus;
  generating a second regular matrix selected at random as a matching key matrix by the key generation apparatus;
  generating an auxiliary key matrix from a matrix product of the registration key matrix and the matching key matrix by the key generation apparatus;
  generates a registered feature vector from registered information input by the first transformation apparatus;
  generating a registered concealed vector by calculating a product of the registered feature vector and the registration key matrix received from the key generation apparatus by the first transformation apparatus;
  generating a matching feature vector from matching information input by the second transformation apparatus;
  generating a matching concealed vector by calculating a product of the matching feature vector and the matching key matrix received from the key generation apparatus by the second transformation apparatus; and
  matching the registered information and the matching information by calculating a vector-matrix product of the registered concealed vector, the matching concealed vector and the auxiliary key matrix by the matching apparatus.

According to an eighth aspect of the present invention, there is provided a key generation method for matching registered information and matching information using a first transformation apparatus, a second transformation apparatus, and a matching apparatus, the first transformation apparatus generating a registered feature vector from the registered information input, and generating a registered concealed vector by calculating a product of the registered feature vector and a registration key matrix received from the key generation apparatus, the second transformation apparatus generating a matching feature vector from the matching information input, and generating a matching concealed vector by calculating a product of the matching feature vector and a matching key matrix received from the key generation apparatus, the matching apparatus calculating a vector-matrix product of the registered concealed vector, the matching concealed vector and an auxiliary key matrix, the registered concealed vector being received from the first transformation apparatus, and the matching concealed vector being received from the second transformation apparatus, wherein the key generation method comprises:

generating a first regular matrix selected at random as the registration key matrix,
  generating a second regular matrix selected at random as the matching key matrix, and
  generating the auxiliary key matrix from a matrix product of the registration key matrix and the matching key matrix.

According to a ninth aspect of the present invention, there is provided a matching method for matching registered information and matching information using a key generation apparatus, a first transformation apparatus, and a second transformation apparatus, the key generation apparatus generating a first regular matrix selected at random as a registration key matrix, generating a second regular matrix selected at random as a matching key matrix, and generating an auxiliary key matrix from a matrix product of the registration key matrix and the matching key matrix; the first transformation apparatus generating a registered feature vector from the registered information input, and generating a registered concealed vector by calculating a product of the registered feature vector and the registration key matrix received from the key generation apparatus; and the second transformation apparatus generating a matching feature vector from matching information input, and generating a matching concealed vector by calculating a product of the matching feature vector and the matching key matrix received from the key generation apparatus, wherein the matching method comprises:

matching the registered information and the matching information by calculating a vector-matrix product of the registered concealed vector, the matching concealed vector and the auxiliary key matrix, the registered concealed vector being received from the first transformation apparatus, the matching concealed vector being received from the second transformation apparatus, and the auxiliary key matrix being received from the key generation apparatus.

According to a tenth aspect of the present invention, there is provided a first transformation method for registering a registered conceal vector to a matching apparatus for a matching method using a key generation apparatus, a second transformation apparatus, and the matching apparatus, the key generation apparatus generating a first regular matrix selected at random as a registration key matrix, generating a second regular matrix selected at random as a matching key matrix, and generating an auxiliary key matrix from a matrix product of the registration key matrix and the matching key matrix, the second transformation apparatus generating a matching feature vector from matching information input, and generating a matching concealed vector by calculating a product of the matching feature vector and the matching key matrix received from the key generation apparatus, the matching apparatus calculating a vector-matrix product of the matching concealed vector a registered concealed vector, and the auxiliary key matrix, the matching concealed vector being received from the second transformation apparatus and the auxiliary key matrix being received from the key generation apparatus, wherein the first transformation method comprises:

generating a registered feature vector from the registered information input,
  generating the registered concealed vector by calculating a product of the registered feature vector and the registration key matrix received from the key generation apparatus, and
  transmitting the registered concealed vector to the matching apparatus.

According to an eleventh aspect of the present invention, there is provided a second transformation method for transmitting a matching concealed vector to a matching apparatus for a matching method using a key generation apparatus, a first transformation apparatus, and the matching apparatus, the key generation apparatus generating a first regular matrix selected at random as a registration key matrix, generating a second regular matrix selected at random as a matching key matrix, and generating an auxiliary key matrix from a matrix product of the registration key matrix and the matching key matrix, the first transformation apparatus generating a registered feature vector from the registered information input, and generating a registered concealed vector by calculating a product of the registered feature vector and the registration key matrix received from the key generation apparatus, the matching apparatus calculating a vector-matrix product of the registered concealed vector, the matching concealed vector input and the auxiliary key matrix, the registered concealed vector being received from the first transformation apparatus and the auxiliary key matrix being received from the key generation apparatus, wherein the second transformation method comprises:

generating a matching feature vector from matching information input, generating the matching concealed vector by calculating a product of the matching feature vector and the matching key matrix received from the key generation apparatus, and transmitting the matching concealed vector to the matching apparatus.

According to each aspect of the present invention, it becomes possible to provide a matching system, a key generation apparatus, a matching apparatus, a first transformation apparatus, a second transformation apparatus, and methods thereof, which contribute to improve security of the cancellable biometrics.

BRIEF DESCRIPTION OF THE DRAWINGS

FIG. 7 is a drawing illustrating an extended example of a registered feature vector and a matching feature vector.

EXAMPLE EMBODIMENTS

Example embodiments of the present invention will be described with reference to the drawings. The present invention, however, is not limited to the example embodiments described below. Further, in each drawing, the same or corresponding elements are appropriately designated by the same reference signs. It should also be noted that the drawings are schematic, and the dimensional relationships and the ratios between the elements may differ from the actual ones. The dimensional relationships and the ratios between drawings may also be different in some sections.

First Example Embodiment

Figure 1:
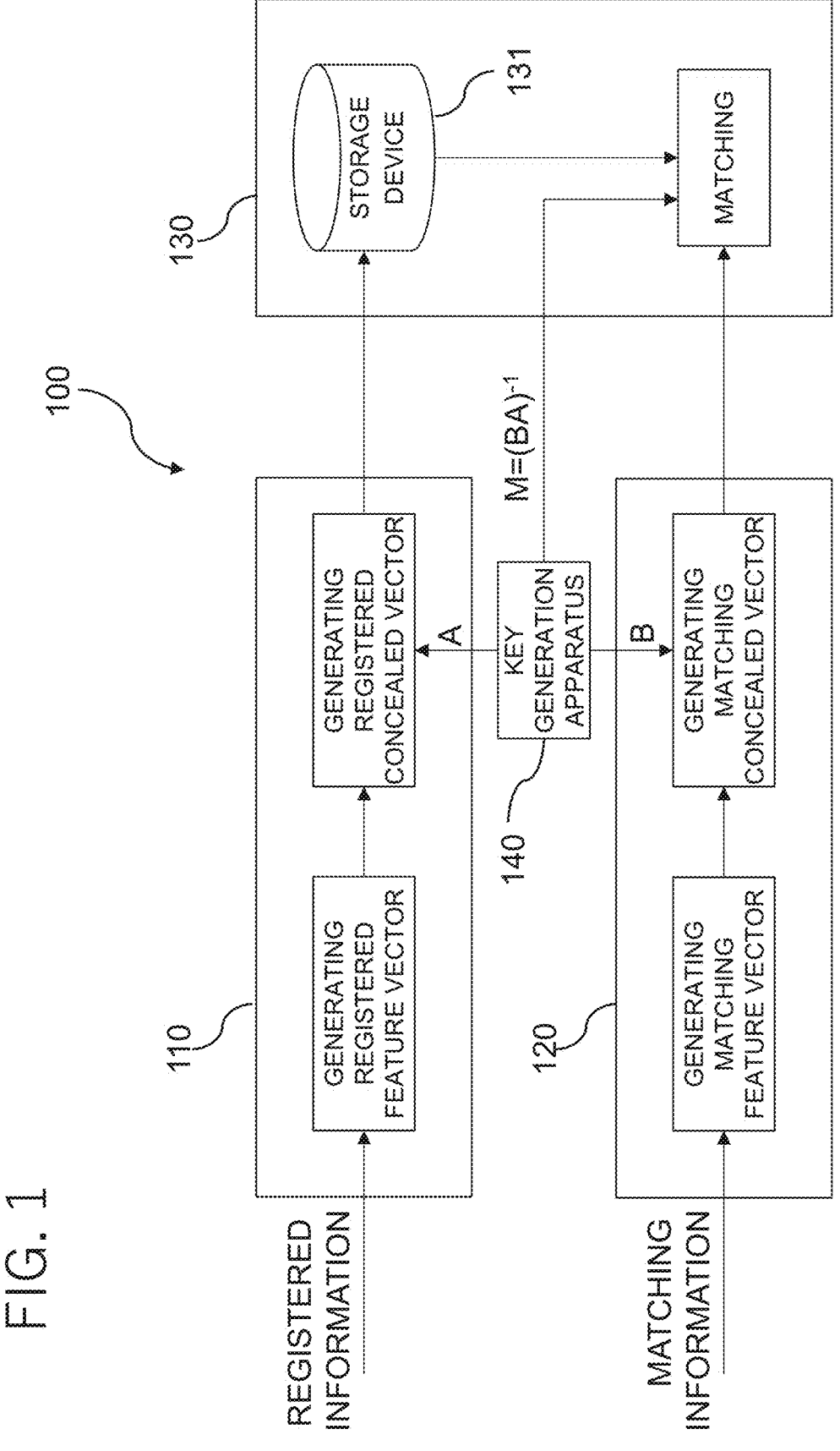
FIG. 1 is a drawing illustrating a schematic configuration of a matching system according to a first example embodiment.

FIG. 1 is a drawing illustrating a schematic configuration of a matching system according to a first example embodiment. As illustrated in FIG. 1. a matching system 100 uses a key distributed by a key generation apparatus 140 to match a registered information input to a first transformation apparatus 110 with a matching information input to a second transformation apparatus 120 using a matching apparatus 130. It is possible to unite (or integrate) the first transformation apparatus 110 and the second transformation apparatus 120 into one device, but it is also possible to make the first transformation apparatus 110 and the second transformation apparatus 120 independent devices. The first transformation apparatus 110 and the second transformation apparatus 120 are described here as separate devices to facilitate explanation of their functions.

The key generation apparatus 140 uses an n×n dimensional regular matrix, which is selected at random, as a first regular matrix, and transmits the first regular matrix as a registration key matrix A to the first transformation apparatus 110. In addition, the key generation apparatus 140 uses another n×n dimensional regular matrix, which is selected randomly, as a second regular matrix, and transmits the second regular matrix as a matching key matrix B to the second transformation apparatus 120. The key generation apparatus 140, then, generates an auxiliary key matrix M from a matrix product of an inverse matrix of the registration key matrix and an inverse matrix of the matching key matrix, and transmits the auxiliary key matrix to the matching apparatus 130.

A manner for selecting the regular matrix at random is, for example, to prepare a list of n×n dimensional regular matrices from which one is selected uniformly at random. Another method is, for example, to select one from square matrices in which random numbers of the squares of n (natural number) are assigned to each element and non-regular matrices are excluded therefrom. To exclude non-regular matrices, for example, matrices whose determinant is zero may be excluded. The random number assigned to each element may be a so-called pseudo random number sequence. The pseudo random number sequence $a_1, a_2, \ldots$ , am is generally generated by performing deterministic calculation on seeds input, and is configured in such a way that it is substantially impossible to predict am from $a_1, a_2, \ldots, a_{m-1}$.

Note that information on the registration key matrix and the matching key matrix cannot be leaked from the auxiliary key matrix alone. That is, even if the auxiliary key matrix is known, all n×n dimensional regular matrices remain as candidates for the registration key matrix and/or the matching key matrix.

The first transformation apparatus 110 generates a registered feature vector of order n (n is a given natural number) from the registered information. For example, the registered information includes features extracted from images such as face, iris, fingerprints, palm prints, and veins of fingers and palms, and features extracted from audio data such as voiceprints. Patterns such as fingerprints and palm prints have distinctive patterns called minutiae. The first transformation apparatus 110 may generates the registered feature vector using these minutiae digitalized. The registered feature vector may be generated by simply arranging features extracted from the registered information, but it is possible to devise a configuration of the registered feature vector as described below.

The first transformation apparatus 110 generates a registered concealed vector by calculating a product of the registered feature vector and the registration key matrix A. Here, the product of the registered feature vector and the registration key matrix is a product of a matrix and a vector as linear algebra. An order of the regular matrix is the same as an order of the registered feature vector. If the order of the registered feature vector is n (n is a natural number), the regular matrix is an n×n matrix.

It is possible to use real numbers for each value of the feature and the matrix. In other words, if real numbers are used for original features, inner products of the features can be calculated using those real numbers, with almost no loss of accuracy. It is also possible to use integers in a certain range for each value of the feature and the matrix. This is because in modular calculations, in which a modulus is a prime number, results of addition, subtraction, and multiplication can be remainders of results of usual addition, subtraction, and multiplication divided by p, respectively, and an inverse number can be defined as a number whose remainder, obtained by dividing the result of multiplication by p, is 1 to calculate an inverse matrix. When integers in a certain range are used, each value of the feature is multiplied by a constant and then rounded to an integer, so that it can be made greater than or equal to the maximum possible value of the inner product of the feature rounded as modulus p. This allows the inner product thereof to be calculated with little degradation in accuracy.

The first transformation apparatus 110 transmits the registered concealed vector generated as described above to the matching apparatus 130 and registers it in a storage device 131 provided in the matching apparatus 130. The storage device 131 may be provided inside of the matching apparatus 130, or the storage device 131 may be provided outside of the matching apparatus 130.

The second transformation apparatus 120 generates a matching feature vector form the matching information. The method for generating the matching feature vector from the matching information is the same as the method for generating the registered feature vector from the registered information. That is, the matching feature vector is generated from features extracted from the matching information.

The second transformation apparatus 120 uses an inverse matrix of the registration key matrix generated as described above as a matching key matrix, and generates a matching concealed vector by calculating a product of the matching feature vector and the matching key matrix. The product of the matching feature vector and the matching key matrix is also a product of a matrix and a vector as linear algebra, same as the product of the registered feature vector and the registration key matrix. The second transformation apparatus 120 differs from the first transformation apparatus 110 in that it uses the matching key matrix, which is the inverse matrix of the registration key matrix, instead of the registration key matrix, which is used to generate the registered concealed vector. However, as mentioned above, the first transformation apparatus 110 and the second transformation apparatus 120 can be united (or integrated) into one device. Accordingly, as described above, it is possible to unite (or integrate) the first transformation apparatus 110 and the second transformation apparatus 120 into one device.

The second transformation apparatus 120 transmits the matching concealed vector generated as described above to the matching apparatus 130.

The matching apparatus 130 calculates a vector-matrix product in the matching concealed vector, the registered concealed vector, and the auxiliary key matrix M. The matching concealed vector is received from the second transformation apparatus 120 and the registered concealed vector is registered in the storage device 131. As described below, a calculation of this inner product corresponds to a calculation of the inner product of the registered feature vector and the matching feature vector. The inner product of the registered feature vector and the matching feature vector indicates a similarity between the registered information and the matching information. Therefore, if the similarity is within a predetermined range, the registered information can be judged to match the matching information. The matching result between the registered information and the matching information can be transmitted by the matching apparatus 130 to the second transformation apparatus 120, or it can be used as a trigger for another process.

The principle by which the matching system 100 described above functions is explained hereinafter.

The registration key matrix A is a regular matrix of n×n selected at random. On the other hand, the matching key matrix B is also a regular matrix of n×n selected at random. The auxiliary key matrix M is an inverse matrix $(BA)^{-1}$ of a matrix product BA of the registration key matrix A and the matching key matrix B. Since the registration key matrix A and the matching key matrix B are regular matrices, the auxiliary key matrix M is also a regular matrix.

A registered feature vector generated from registered information is denoted as x, and a matching feature vector generated from matching information is denoted as y. Then, a registered concealed vector t is a product of the registered feature vector x and the registration key matrix A, therefore, $t=A^T x$ holds, and a matching concealed vector s is a product of the matching feature vector and the matching key matrix B, therefore, $s=Bx$ holds. Note that the subscript T indicates that it is a transposed matrix. When calculation of the inner product is expressed as a product of matrices, it is necessary to transpose one of the matrices. For this reason, the transposition is performed in advance.

When matching, a vector-matrix product in the matching concealed vector, the auxiliary key matrix, and the registered concealed vector is calculated. As a calculation of the product here, $t^T Ms$ is calculated for the registered concealed vector t, the auxiliary key matrix M, and the matching concealed vector s. Considering that the auxiliary key matrix M is $(BA)^{-1}$, a result of this calculation matches an inner product of the registered feature vector x and the matching feature vector y, as shown below.

$$(A^T x)^T M(By) = x^T$$
$$(A(BA)^{-1}B)y = x^T$$
$$(AA^{-1}B^{-1}B)y = x^T$$
$$y = <x, y>$$

The inner product <x, y> of the registered feature vector x and the matching feature vector y is an index indicating a similarity. For example, normalized correlation is often used as the index indicating a similarity for vectors. The normalized correlation of two vectors $x=(x_1, x_2, \ldots, x_n)T$ and $y=(y_1, y_2, \ldots, y_n)T$ is defined as following formula. This normalized correlation indicates similarity if it is large, and dissimilarity if it is small. As can be seen from the definition given by the following formula, if the two vectors x and y are normalized, the normalized correlation is an inner product itself. Therefore, if the registered feature vector x and the matching feature vector y are normalized, the inner product <x, y> of the registered feature vector x and the matching feature vector y can be used as the index indicating a similarity.

$$\sum x_i y_i \Big/ \sqrt{\sum x_i^2 \sum y_i^2} \qquad \text{[Math 1]}$$

For example, a Euclidean distance is also often used as an index indicating a similarity for vectors. The Euclidean distance of two vectors $x=(x_1, x_2, \ldots, x_n)T$ and $y=(y_1, y_2, \ldots, y_n)^T$ is defined as following formula. This Euclidean distance indicates similarity if it is small, and dissimilarity if it is large. As can be seen from the definition given by the following formula, an inner product of two vectors $x'=(\Sigma x_1^2, 1, x_1, x_2, \ldots, x_n)^T$ and $y'=(1, \Sigma y_i^2, -2y_1, -2y_2, \ldots, -2y_n)^T$ is the Euclidean distance itself. Therefore, if the registered feature vector and the matching feature vector are x' and y', respectively, for two vectors x and y for which the Euclidean distance is to be calculated, the inner product <x', y'> of the registered feature vector x' and the matching feature vector y' can be used as an index indicating a similarity (i.e., the Euclidian distance between the two vectors x and y).

$$\sum (x_i - y_i)^2 = \sum x_i^2 + \sum y_i^2 + \sum (-2 x_i y_i) \qquad \text{[Math 2]}$$

For example, a Hamming distance is also often used as an index of a similarity for binary vectors (i.e., vectors whose elements are 0 or 1). The Hamming distance of two vectors $x=(x_1, x_2, \ldots, x_n)^T$ and $y=(y_1, y_2, \ldots, y_n)^T$ is defined as the following formula. This normalized correlation (Hamming distance) indicates similarity if it is small, and dissimilarity if it is large. As can be seen from the definition given by the following formula, an inner product of two vectors $x'=(1, x_1, x_2, \ldots, x_n)^T$ and $y'=(\Sigma y_i^2, 1-2y_1, 1-2y_2, \ldots, 1-2y_n)^T$ is the Hamming distance itself. Therefore, if the registered feature vector and the matching feature vector are x' and y', respectively, for two vectors x and y for which the Hamming distance is to be calculated, the inner product <x', y'> of the registered feature vector x' and the matching feature vector y' can be used as an index indicating a similarity (i.e., the Hamming distance between the two vectors x and y).

$$\sum |x_i - y_i| = \sum y_i + \sum x_i (1 - 2 y_i) \qquad \text{[Math 3]}$$

Next, it is explained that the matching system 100 described above can update a key.

Two different regular matrices $\Delta_A$ and $\Delta_B$ selected at random are prepared. These regular matrices $\Delta_A$ and $\Delta_B$ are also n×n matrices like the registration key matrix and the matching key matrix. In the key update, these regular matrices $\Delta_A$ and $\Delta_B$ are multiplied by the registration key matrix A and the matching key matrix B, respectively. Concretely, for the original registration key matrix A, a new registration key matrix is set to $A\Delta_A$, and for the original matching key matrix B, a new matching key matrix is set to $B\Delta_B$. For the original auxiliary key matrix $M=(BA)^{-1}$, a new auxiliary key matrix is set to $\Delta_A^{-1}M\Delta_B^{-1}=\Delta_A^{-1}(BA)^{-1}\Delta_B^{-1}$.

Even with the new registration key matrix $A\Delta_A$ and the new matching key matrix $B\Delta_B$ updated in this way, a calculation result of a vector-matrix product in the registered concealed vector $(A\Delta_A)^T x$, the new auxiliary key matrix $\Delta_A^{-1}M\Delta_B^{-1}$, and the matching concealed vector $\Delta_B$ By will match the inner product of the registered feature vector x and the matching feature vector y.

$$((A\Delta_A)^T x)^T (\Delta_A^{-1} M \Delta_B^{-1})(\Delta_B By) = x^T$$
$$(A\Delta_A(\Delta_A^{-1} M \Delta_B^{-1})\Delta_B B)y = x^T$$
$$(AMB)y = x^T$$
$$(AA^{-1}B^{-1}B)y = x^T$$
$$y = \langle x, y \rangle$$

In addition, in the key update, the registered concealed vector that has already been registered will be also updated. The registered feature vector that has already been registered is concealed using the original registration key matrix A. Therefore, the registered concealed vector that has already been registered is updated so that it can be matched using the new matching key matrix $\Delta_B B$. Concretely, when the registered concealed vector that is concealed using the original registration key matrix A is $A^T x$, an updated registered concealed vector is $\Delta_A^T (A^T x)$. The fact that this updated registered concealed vector $\Delta_A^T(A^T x)$ is the same as the one concealed using the new registration key matrix $A\Delta_A$ can be understood from the fact that $\Delta_A^T(A^T x)=\Delta_A^T A^T x=(A\Delta_A)^T x$.

In this way, in the key update in the matching system 100, the original registered feature vector is updated by multiplying the registered feature vector $A^T x$ which has already been registered by other regular matrix $\Delta_A$ selected at random so that it can be matched using a new matching key matrix $\Delta_B B$. Thus, in the matching system 100 of this example embodiment, when it is necessary to invalidate a registered feature vector, which has already been registered, due to an unforeseen situation such as an information leakage, the original registered feature vector is updated so that it cannot be matched unless a new matching key matrix is used. Note that invalidation here means that it is impossible to determine whether or not registered concealed vectors and/or matching concealed vectors, which are generated using different keys, are generated from the same feature, if there is no other information leakage.

(Matching Method)

Figure 2:
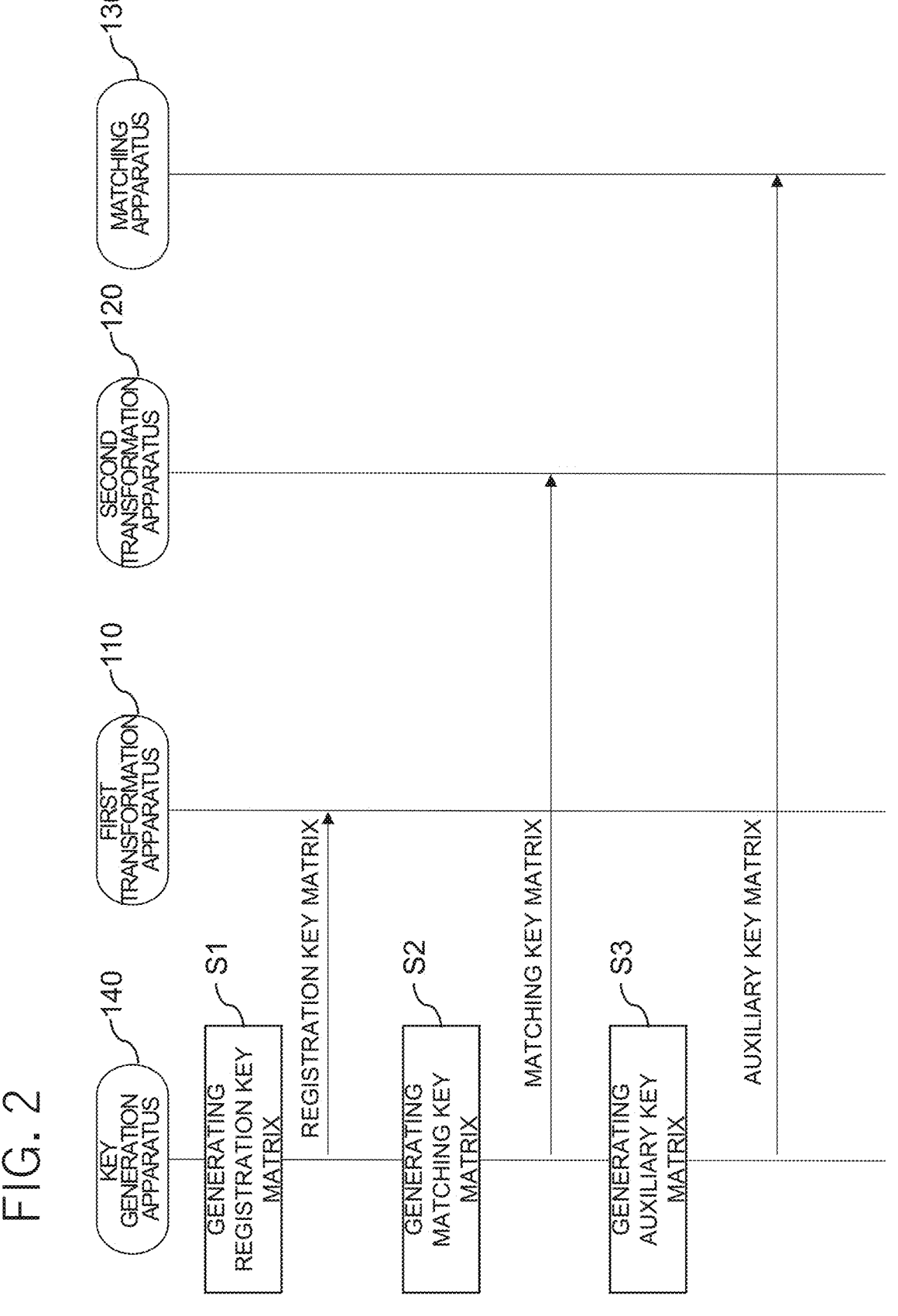
FIG. 2 is a system flow diagram illustrating a key generation method according to the first example embodiment.
Figure 3:
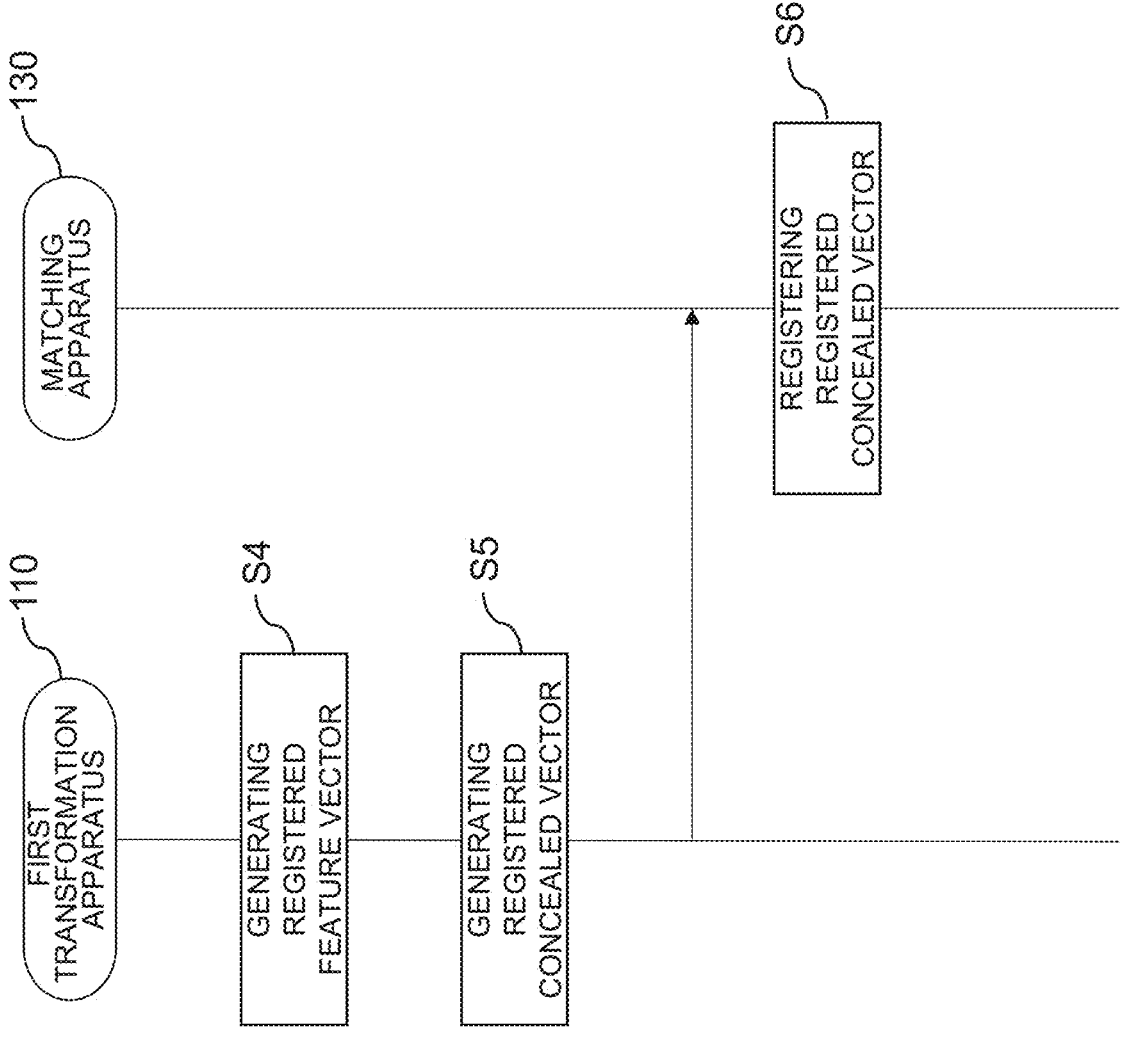
FIG. 3 is a system flow diagram illustrating a first transformation method according to the first example embodiment.
Figure 4:
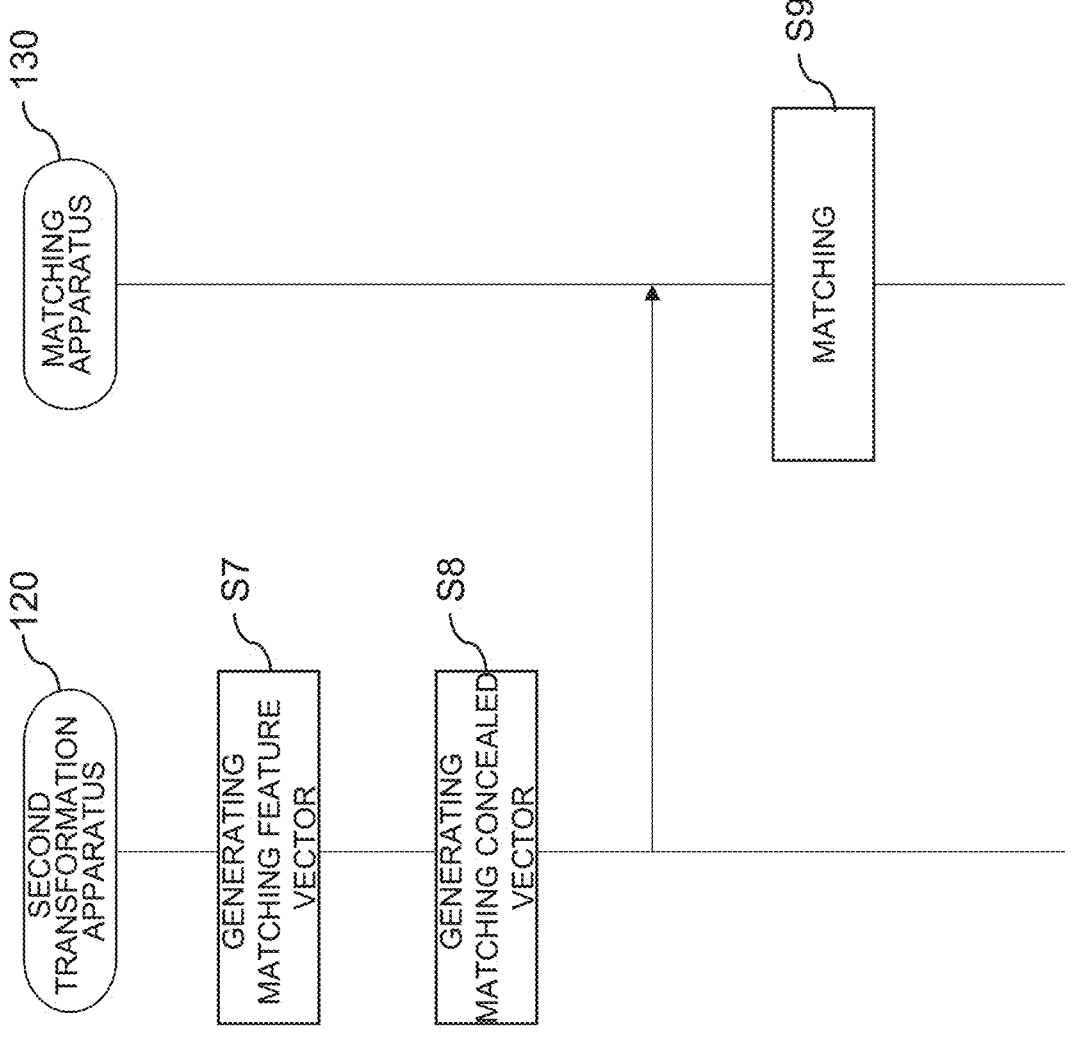
FIG. 4 is a system flow diagram illustrating a second transformation method according to the first example embodiment.

FIG. 2 to FIG. 4 are system flow charts illustrating a matching method according to the first example embodiment. The matching method illustrated in FIG. 2 to FIG. 4 is a matching system in which a registered information input to the first transformation apparatus 110 and a matching information input to the second transformation apparatus 120 are matched in the matching apparatus 130, using a key distributed by the key generation apparatus 140. The first transformation apparatus 110 and the second transformation apparatus 120 can be united (or integrate) into one device. A first transformation method illustrated in FIG. 3 and a second transformation method illustrated in FIG. 4 can be repeated independently and in any order. That is, the first transformation method illustrated in FIG. 3 can be repeated as many times as the number of registered information to be registered, and the second transformation method illustrated in FIG. 4 can be performed at any timing that requires authentication of matching information.

As illustrated in FIG. 2, steps S1 through S3 are executed when performing a key generation. In step S1, the key generation apparatus 140 generates a registration key matrix and transmits the registration key matrix to the first transformation apparatus 110. In step S2, the key generation apparatus 140 generates a matching key matrix and transmits the matching key matrix to the second transformation apparatus 120. In step S3, the key generation apparatus 140 generates an auxiliary key matrix and transmits the auxiliary key matrix to the matching apparatus 130. These key matrices are stored in each apparatus.

As illustrated in FIG. 3, in step S4, the first transformation apparatus 110 generates a registered feature vector from registered information. The registered feature vector may be generated by simply arranging features extracted from the registered information, or it can be configured to obtain a normalized correlation, a Euclidean distance, or a Hamming distance by devising a configuration of the registered feature vector as described above.

Next, in step S5, the first transformation apparatus 110 generates a registered concealed vector by calculating a product of the registered feature vector and the registration key matrix. A configuration of the registration key matrix has already been explained. The first transformation apparatus 110 transmits the registered concealed vector generated to the matching apparatus 130.

Next, in step S6, the matching apparatus 130 registers the registered concealed vector received from the first transformation apparatus 110 in the storage device 131. As mentioned above, steps S4 through S6 can be repeated as many times as the number of registered information to be registered.

On the other hand, as illustrated in FIG. 4, steps S7 through S9 are executed when performing a matching method according to the first example embodiment. In step S7, the second transformation apparatus 120 generates a matching feature vector from matching information. The matching feature vector may be generated by simply arranging features extracted from the matching information, which is the same as the method for generating the registered feature vector from the registered information, or it can be configured to obtain a normalized correlation, a Euclidean distance, or a Hamming distance by devising a configuration of the registered feature vector.

Next, in step S8, the second transformation apparatus 120 generates a matching concealed vector by calculating a product of the matching feature vector and a matching key matrix. A relationship between the registration key matrix and the matching key matrix and a configuration of the matching key matrix have already been explained. The second transformation apparatus 120 transmits the matching concealed vector generated to the matching apparatus 130.

Finally, in step S9, the matching apparatus 130 matches the registered information and the matching information by calculating a vector-matrix product in the matching concealed vector, the registered concealed vector, and the auxiliary key matrix. The matching concealed vector is received from the second transformation apparatus 120, the registered concealed vector is registered in the storage device 131, the auxiliary key matrix is transmitted from the key generation apparatus 140.

Thus, it is possible to combine the first transformation method illustrated in FIG. 3 and the second transformation method illustrated in FIG. 4 to implement the first example embodiment as a matching method.

(Example of Hardware Configuration)

Figure 5:
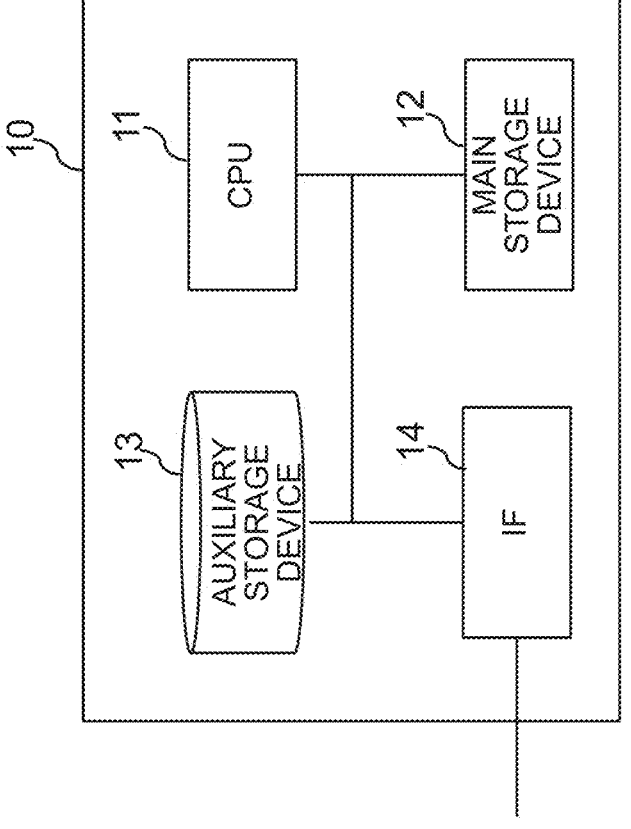
FIG. 5 is a drawing illustrating an example of a hardware configuration of an apparatus used for example embodiments.

FIG. 5 is a drawing illustrating an example of a hardware configuration of apparatuses used for the example embodiments. In other words, the first transformation apparatus 110, the second transformation apparatus 120, and the matching apparatus 130 make information processing apparatus(es) (computer(s)) employing the hardware configuration illustrated in FIG. 5 execute matching method described above as programs to be able to achieve each function of the first transformation apparatus 110, second transformation apparatus 120, and matching apparatus 130. It should be noted that the hardware configuration example illustrated in FIG. 5 is merely an example of the hardware configuration that achieves the functions of the first transformation apparatus 110, the second transformation apparatus 120, and the matching apparatus 130 and is not intended to limit the hardware configuration of the first transformation apparatus 110, the second transformation apparatus 120, and the matching apparatus 130. The first transformation apparatus 110, the second transformation apparatus 120, and the matching apparatus 130 may include hardware not illustrated in FIG. 5.

As illustrated in FIG. 5, the hardware configuration 10 that may be employed by the first transformation apparatus 110, the second transformation apparatus 120, and the matching apparatus 130 is provided with a CPU (Central Processing Unit) 11, a main storage device 12, an auxiliary storage device 13, and an IF (interface) part 14, which are connected to each other via an internal bus or the like.

The CPU 11 executes each instruction included in programs executed by the first transformation apparatus 110, the second transformation apparatus 120, and the matching apparatus 130. The main storage device 12 is, for example, a RAM (Random Access Memory) and temporarily stores various programs such as the programs executed by the first transformation apparatus 110, the second transformation apparatus 120, and the matching apparatus 130 so that the CPU 11 can process the programs.

The auxiliary storage device 13 is, for example, an HDD (Hard Disk Drive) and is capable of storing the various programs executed by the first transformation apparatus 110, the second transformation apparatus 120, and the matching apparatus 130, or the like, in the medium to long term. The various programs such as the programs may be provided as a program product stored in a non-transitory computer-readable storage medium.

The IF part 14 provides an interface for inputting and outputting among, for example, the first transformation apparatus 110, the second transformation apparatus 120, and the matching apparatus 130.

The information processing apparatus employing the hardware configuration 10 described above achieves the functions of the first transformation apparatus 110, the second transformation apparatus 120, and the matching apparatus 130 by executing the programs described above.

Second Example Embodiment

In the second example embodiment, the way to update a key is devising so as to configure an auxiliary key matrix to be invariant. Here, as in the first example embodiment, an original registration key matrix is A, an original matching key matrix is B, and an original auxiliary key matrix is $M=(BA)^{-1}$. As indicated in the description of the key update in the first example embodiment, two different regular matrices $\Delta_A$ and $\Delta_B$ both selected at random are prepared, a new registration key matrix is set to $A\Delta_A$, a new matching key matrix is set to $B\Delta_B$, and a new auxiliary key matrix is set to $\Delta_A^{-1}M\Delta_B^{-1}$. Thus, the key can be updated.

In the second example embodiment, for example, random numbers are used as elements of one regular matrix $\Delta_A$, and the other regular matrix is set to $\Delta_B=M^{-1}\Delta_A^{-1}M$. Then the new auxiliary key matrix becomes $\Delta_A^{-1}M\Delta_B^{-1}=\Delta_A^{-1}M(M^{-1}\Delta_A^{-1}M)^{-1}=\Delta_A M^{-1}MM^{-1}\Delta_A M=M$, and the auxiliary key matrix M does not change. Note that the new registration key matrix is $A\Delta_A$, and the new matching key matrix is $\Delta_B B=M^{-1}\Delta_A^{-1}MB$.

If the key is updated in this way, it is possible to block vulnerability without changing the auxiliary key matrix M, even if it becomes necessary to update the registration key matrix and the matching key matrix due to a leak or other possibilities.

Third Example Embodiment

In the third example embodiment, the way to update a key is devising so as to configure a registration key matrix to be invariant. Here, as in the first example embodiment, an original registration key matrix is A, an original matching key matrix is B, and an original auxiliary key matrix is $M=(BA)^{-1}$. As indicated in the description of the key update in the first example embodiment, two different regular matrices $\Delta_A$ and $\Delta_B$ both selected at random are prepared, a new registration key matrix is set to $A\Delta_A$, a new matching key matrix is set to $B\Delta_B$, and a new auxiliary key matrix is set to $\Delta_A^{-1}M\Delta_B^{-1}$. Thus, the key can be updated.

In the third example embodiment, random numbers are used as elements of one regular matrix $\Delta_B$, the new matching key matrix is set to $\Delta_B B$, and the new auxiliary key matrix is set to $\Delta_B^{-1}=(BA)^{-1}\Delta_B^{-1}(\Delta_B BA)^{-1}$. On the other hand, the regular matrix $\Delta_A$ is to be the unit matrix. Then, there is no need to update the original registration key matrix A. In fact, an inner product <x, y> of a registered feature vector x and a matching feature vector y can be correctly obtained by calculating a product of the original registration key matrix A, the new matching key matrix $\Delta_B B$ and the new auxiliary key matrix $M\Delta_B^{-1}$, as shown below.

$$(A^T x)^T (M\Delta_B^{-1})(\Delta_B By) = x^T$$

$$(AM\Delta_B^{-1}\Delta_B B)y = x^T$$

$$(AMB)y = x^T$$

$$(AA^{-1}B^{-1}B)y = x^T$$

$$y = <x, y>$$

Thus, by updating a key without changing the registration key matrix A, it is no longer necessary to update the registered concealed vector $A^T x$ stored in the matching apparatus 130. The registered concealed vectors $A^T x$ stored in the matching apparatus 130 can be in large numbers. Therefore, by reducing a frequency of updating the registered concealed vector $A^T x$ compared to the matching key matrix B and the auxiliary key matrix M, it is possible to reduce an amount of processing required to update the key.

Fourth Example Embodiment

In the fourth example embodiment, the way to update a key is devising so as to configure a matching key matrix to be invariant. Here, as in the first example embodiment, an original registration key matrix is A, an original matching key matrix is B, and an original auxiliary key matrix is $M=(BA)^{-1}$. As indicated in the description of the key update in the first example embodiment, two different regular matrices $\Delta_A$ and $\Delta_B$ selected at random are prepared, a new registration key matrix is set to $A\Delta_A$, a new matching key matrix is set to BAB, and a new auxiliary key matrix is set to $\Delta_A^{-1}M\Delta B^{-1}$. Thus, the key can be updated.

In the fourth example embodiment, random numbers are used as elements of one regular matrix $\Delta_A$, the new registration key matrix is set to $A\Delta_A$, and the new auxiliary key matrix is set to $\Delta_A^{-1}M=\Delta_A^{-1}(BA)^{-1}=(BA\Delta_A)^{-1}$. On the other hand, the regular matrix $\Delta_B$ is to be the unit matrix. Then, there is no need to update the original matching key matrix B. In fact, an inner product <x, y> of a registered feature vector x and a matching feature vector y can be correctly obtained by calculating a product of the new registration key matrix $A\Delta_A$, the original matching key matrix B and the new auxiliary key matrix $\Delta_A^{-1}M$, as shown below.

$$((A\Delta_A)^T x)^T (\Delta_A^{-1}M)(By) = x^T$$

$$(A\Delta_A(\Delta_A^{-1}M)B)y = x^T$$

$$(AMB)y = x^T$$

$$(AA^{-1}B^{-1}B)y = x^T$$

$$y = <x, y>$$

As an example, a following utilization embodiment is considered. The utilization embodiment, where a registration is performed at a dedicated terminal placed at a specific location, such as a store, an extraction of biometric information as authentication information is performed using a user's smartphone, etc., and matching it with the registered information is performed on a server at a service provider, is assumed. In this case, it is easy to update a registration key and an auxiliary key which are under the control of the service provider. However, it is difficult to update a matching key, which is widely distributed as embedded in a smartphone application, without a cooperation of each user. In this type of utilization embodiment, key update can be performed without changing the matching key matrix B, thereby increasing an updatability of the key.

Fifth Example Embodiment

The fifth example embodiment described below is an example embodiment with enhanced security over the first example embodiment. Concretely, in the fifth example embodiment, leak tolerance of a key is increased over the first example embodiment. For example, if a plurality of pairs of registered feature vector and registered concealed vector corresponded thereof are leaked due to unforeseen situation, a registration key matrix is likely to be inferred from the plurality of pairs of registered feature vector and registered concealed vector leaked. This is also the case when a plurality of pairs of matching feature vector and matching concealed vector is leaked.

A condition that the registration key matrix can be inferred from a plurality of registered feature vectors and registered concealed vectors leaked can be attributed to a condition that simultaneous equations can be solved. A relation between a registered feature vector x, a registered concealed vector t and a registration key matrix A is expressed as simultaneous equations $A^T x=t$. Therefore, it can be attributed to the condition that the simultaneous equations can be solved, and the number of known constraint equations $\geq$ the number of unknown variables.

Where simultaneous equations $A^T x=t$ has n constraint equations and $n^2+2n$ variables. The $n^2+2n$ variables are the sum of n for the registered feature vector x, n for the registered concealed vector t, and $n^2$ for the registration key matrix A.

Of these $n^2+2n$ variables, when one registered feature vector x leaks, n variables change from unknown variables to known variables, and when one registered concealed vector t leaks, n variables change from unknown variables to known variables. Furthermore, when k pairs of registered feature vector x and registered concealed vector t are leaked, the number of known constraint equations is to be kn (k equations for $A^T x = t$), while the number of unknown variables is to be $n^2$ for the registration key matrix A, which is commonly used. These relationships are summarized in the following table.

TABLE 1

| leaked data | number of known constraint equations | number of unknown variables |
|---|---|---|
| non | n | $n^2 + 2n$ |
| one registered concealed vector | | $n^2 + n$ |
| one pair of registered concealed vector and registered feature vector | | $n^2$ |
| k registered concealed vectors | kn | $n^2 + kn$ |
| k pairs of registered concealed vector and registered feature vector | | $n^2$ |

As can be seen from the above relationships, if the number k of pairs of registered feature vectors and registered concealed vectors to be leaked is satisfied k<n, the registration key matrix is not identified.

However, it can be said that if there are n or more pairs of registered feature vectors and registered concealed vectors to be leaked, there is a possibility that the registration key matrix is identified. Therefore, in the fifth example embodiment, a following devising is taken to prevent such a situation from occurring.

First, only less than n pairs of registered concealed vectors are to be generated using the same registration key matrix A. If n or more pairs thereof are to be generated, a new registration key matrix A is used. Then, when matching, matching concealed vectors are generated using a matching key matrix corresponding to each registration key matrix, and each matching concealed vector is matched with the registered concealed vector. Furthermore, if the number of times in which matching is performed using the same matching key matrix becomes n or more, there is a possibility that a matching key matrix B leaks from the pair of matching feature vector and matching concealed vector. Therefore, in this case, the key is updated every n−1 times.

The following example shows a case where 100 registered feature vectors are registered and matched when the order n of the registration key matrix and/or registered feature vectors is satisfied n=11.

The registration key matrix used for the 1st to 10th registered feature vectors is $A_1$, and the registration key matrix used for the 11th to 20th registered feature vectors is $A_2$. Hereafter in the same manner, and finally, the registration key matrix used for the 91st to 100th registered feature vectors is $A_{10}$. The registered concealed vectors generated using these registration key matrices are as follows.

$$A_1^T x_1, A_1^T x_2, \ldots, A_1^T x_{10}, A_2^T x_{11}, A_2^T x_{12}, \ldots, A_2^T x_{20}, \ldots, A_{10}^T x_{91}, A_{10}^T x_{92}, \ldots, A_{10}^T x_{100}$$

When matching, a matching concealed vector is generated for one matching feature vector using the matching key matrices $B_1, \ldots, B_{10}$ corresponding to each registration key matrix $A_1, \ldots, A_{10}$. That is, the matching concealed vectors generated from the matching feature vector y are $B_1 y$, $B_2 y, \ldots, B_{10} y$. Then, these matching concealed vectors $B_i y$ and each registered concealed vector $A_i^T x_j$ are matched.

However, if the above matching is repeated 11 or more times, the key may leak. Therefore, every 10 times of matching, regular matrices $\Delta_1, \ldots, \Delta_{10}$ are generated for updating, and each matching key matrix $B_i$ is updated to $\Delta_i B_i$.

In the fifth example embodiment, the number of registered concealed vectors using the same registration key matrix is reduced below a predetermined natural number n as described above, and the second transformation apparatus updates the matching key matrix so that the number of times, of which matching is performed using the same matching key matrix, does not exceed the predetermined natural number n. This prevents vulnerabilities caused by leakage of n or more pairs of registered feature vectors for the same registration key matrix and registered concealed vectors or n or more pairs of matching feature vectors for the same matching key matrix and matching concealed vectors.

Sixth Example Embodiment

The sixth example embodiment described below is also an example embodiment with enhanced security over the first example embodiment. In the matching system described above, the order n of a registered feature vector and the order n of a registration key matrix are the same. Therefore, if a configuration that simply arranges features is adopted for a configuration of the registered feature vector, security, such as leak tolerance of a key, is limited by the number of features. Therefore, in the sixth example embodiment, a devising is taken to improve security without being limited by the number of features.

When two vectors $x' = (r_1, r_2, \ldots, r_p)$ and $y' = (q_1, q_2, \ldots, q_p)$ are orthogonal to each other, an inner product of $x = (x_1, x_2, \ldots, x_m, r_1, r_2, \ldots, r_p)$ and $y = (y_1, y_2, \ldots, y_m, q_1, q_2, \ldots, q_p)$ is equal to an inner product of $x'' = (x_1, x_2, \ldots, x_m)$ and $y'' = (y_1, y_2, \ldots, y_m)$.

Therefore, if $x'' = (x_1, x_2, \ldots, x_m)$ and $y'' = (y_1, y_2, \ldots, y_m)$ are configured with features, and two vectors $x' = (r_1, r_2, \ldots, r_p)$ and $y' = (q_1, q_2, \ldots, q_p)$, which are orthogonal to each other, are added thereto to form a registered feature vector $x = (x_1, x_2, \ldots, x_m, r_1, r_2, \ldots, r_p)$ and a matching feature vector $y = (y_1, y_2, \ldots, y_m, q_1, q_2, \ldots, q_p)$, a value of an inner product remains the same.

For example, two vectors x' and y', orthogonal to each other and to be added, can be configured as follows. The first method is that one of x' and y' is configured with random numbers for all elements, the other is configured with random numbers for all elements except one element, and the one element remaining is used to adjust the two vectors x' and y' so that they are orthogonal to each other. In this method, x' and y' are determined at the time of key generation, and the same x' and y' are used each time in the registration flow.

The second method is that x' is configured as a vector arranging p' random numbers and p−p' zeros and y' is configured as a vector arranging p' zeros and p−p' random numbers, where p' is between 0 and p inclusive. In this method, p' is determined at the time of key generation and pre-setup, and the random numbers in x' and y' are selected independently at the time of concealed vector generation.

Figure 7:
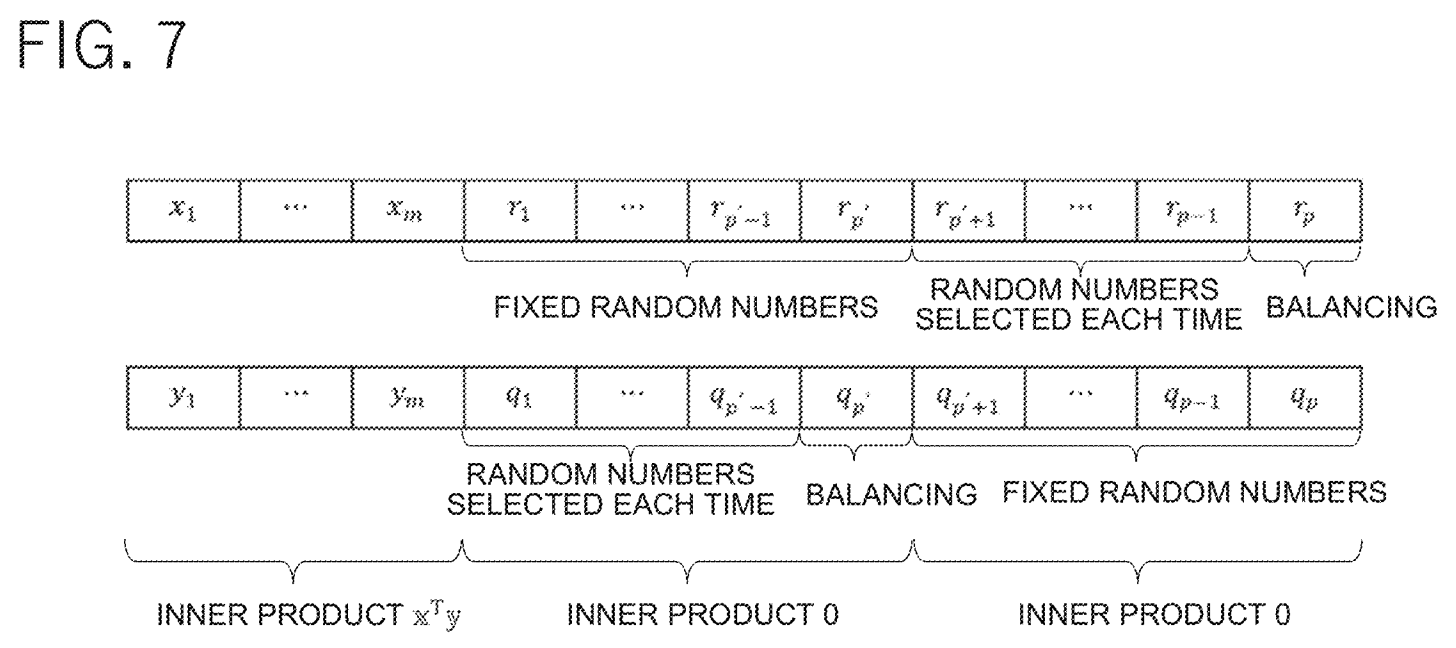

In the third method, as illustrated in FIG. 7, x' is configured as a vector arranging p' fixed random numbers, p−p'−1 random numbers which are selected independently each time, and one value for balancing, and y' is configured as a vector arranging p'−1 random numbers which are selected independently each time, one value for balancing, and p−p' fixed random numbers, where p' is between −2 and 2 inclusive. In this method, fixed random number vectors $(r_1, r_2, \ldots, r_{p'})$ and $(q_{p'+1}, q_{p'+2}, \ldots, q_p)$ are determined at the time of key generation and pre-setup. When generating concealed vectors, the random number vectors $(r_{p'+1},$ $r_{p'+2}, \ldots, r_{p-1})$ and $(q_1, q_2, \ldots, q_{p'-1})$ are independently selected each time, and $r_p$ and $q_{p'}$ are selected such that two inner product values $<(r_1, r_2, \ldots, r_{p'}), (q_1, q_2, \ldots, q_{p'})>$ and $<(r_{p'+1}, r_{p'+2}, \ldots, r_p), (q_{p'+1}, q_{p'+2}, \ldots, q_p)>$ are to be s and $-s$, respectively. That is, an inner product of the registered feature vector $x=(x_1, x_2, \ldots, x_m, r_1, r_2, \ldots, r_p)$ and the matching feature vector $y=(y_1, y_2, \ldots, y_m, q_1, q_2, \ldots, q_p)$ matches an inner product of $x''=(x_1, x_2, \ldots, x_m)$ and $y''=(y_1, y_2, \ldots, y_m)$.

In other words, even if the order of the feature is m, the order n of the registration key matrix and the matching key matrix can be expanded to m+p by adding an orthogonal vector of order p. In addition, a random number component, which is selected in independently each time, is added to both the registered feature vector and the matching feature vector. This improves the leak tolerance of the key and the original feature vector. The following table shows the leak tolerance of the keys.

TABLE 2

| leaked data | number of known constraint equation | number of unknown variable |
|---|---|---|
| non | m + p | $(m + p)^2 + 2(m + p)$ |
| one registered concealed vector | | $(m + p)^2 + m + p$ |
| one pair of registered concealed vector and registered feature vector | | $(m + p)^2$ |
| k registered concealed vectors | k(m + p) | $(m + p)^2 + k(m + p)$ |
| k pairs of registered concealed vector and registered feature vector | | $(m + p)^2$ |

As can be seen from the above relationships, if the number of pairs of registered feature vectors and registered concealed vectors to be leaked, k, are satisfied k<m+p, the registration key matrix is not identified. In other words, even if the number of features is p, leak tolerance, of which the number of pairs of registered feature vectors and registered concealed vectors to be leaked is up to k, can be obtained, by adding an orthogonal vector of order p. If the devising of this example embodiment is combined with the second to fourth example embodiments, it will be possible to prevent vulnerabilities more efficiently.

Seventh Example Embodiment

In the seventh example embodiment, the configuration of a registered feature vector and a matching feature vector is devised so that an inner product of the registered feature vector and the matching feature vector is to be a score of a registered information and matching information referenced in (or given in/as) a score table.

When a score for a feature cannot be expressed in a simple polynomial, a method of giving the score by referring to a score table may be employed. For a vector of features, in the score table, a score is assigned for each value of each element of the vector and the sum of the scores of all elements is a final score.

For example, in the following score table, when the register feature vector is (0, 0, 0) and the matching feature vector is (0, 1, 1), the result obtained from the score table for the first dimension is chart (0, 0)=1, and the results obtained from the score table for the second and third dimensions are chat (0, 1)=−1. Therefore, score is ((0, 0, 0), (0, 1, 1))=1−1−1=−1.

TABLE 3

| | 0 | 1 |
|---|---|---|
| 0 | 1 | −1 |
| 1 | −1 | 2 |

Even with scoring using such a score table, scores can be obtained by calculation by expressing each value of a feature as a vector representation that is transformed to a position where 1 is stored in an element. The vector representation of each value of a feature is a representation of each component $i \in [0, L]$ of the feature as an L+1-dimensional vector where the i-th dimension is 1 and the others are 0. For example, if L=1, 0 is represented as (1, 0) (i.e., the 0th element is 1 and all others are 0) and 1 is represented as (0, 1). Then, the tabular calculation using the above table can be expressed using a matrix operation as follows.

$$\text{chart}(0, 0) = (1, 0)\begin{pmatrix} 1 & -1 \\ -1 & 2 \end{pmatrix}\begin{pmatrix} 1 \\ 0 \end{pmatrix} = 1 \qquad \text{[Math 4]}$$

$$\text{chart}(0, 1) = (1, 0)\begin{pmatrix} 1 & -1 \\ -1 & 2 \end{pmatrix}\begin{pmatrix} 0 \\ 1 \end{pmatrix} = -1$$

Using above relationship, it is also possible to calculate a multi-component tabular calculation as a whole using a vector-matrix product. For example, when the registered feature vector x is (0, 0, 0), each component 0 in the registered feature vector (0, 0, 0) is represented as a vector (1, 0) in the above relationship and a concatenation of these is expressed as x'=(1, 0, 1, 0, 1, 0). Also, for example, when the matching feature vector y is (0, 1, 1), similarly, a concatenation thereof is expressed as y'=(1, 0, 0, 1, 0, 1).

If the registered feature vector x and the matching feature vector y are expressed as x'=(1, 0, 1, 0, 1, 0) and y'=(1, 0, 0, 1, 0, 1), respectively, the score table above is score((0, 0, 0), (0, 1, 1))<x', Cy'> when expressed using following matrix C.

$$C = \begin{pmatrix} 1 & -1 & 0 & 0 & 0 & 0 \\ -1 & 2 & 0 & 0 & 0 & 0 \\ 0 & 0 & 1 & -1 & 0 & 0 \\ 0 & 0 & -1 & 2 & 0 & 0 \\ 0 & 0 & 0 & 0 & 1 & -1 \\ 0 & 0 & 0 & 0 & -1 & 2 \end{pmatrix} \qquad \text{[Math 5]}$$

In fact, score ((0, 0, 0), (0, 1, 1)) is obtained by calculating <x', Cy'> as follows.

[Math 6]

$$\langle x', Cy' \rangle =$$

$$x'^T \cdot C \cdot y' = (1, 0, 1, 0, 1, 0) \cdot \begin{pmatrix} 1 & -1 & 0 & 0 & 0 & 0 \\ -1 & 2 & 0 & 0 & 0 & 0 \\ 0 & 0 & 1 & -1 & 0 & 0 \\ 0 & 0 & -1 & 2 & 0 & 0 \\ 0 & 0 & 0 & 0 & 1 & -1 \\ 0 & 0 & 0 & 0 & -1 & 2 \end{pmatrix} \cdot \begin{pmatrix} 1 \\ 0 \\ 0 \\ 1 \\ 0 \\ 1 \end{pmatrix} =$$

$$(1, -1, 1, -1, 1, -1) \cdot (1, 0, 0, 1, 0, 1)^T =$$

$$1 - 1 - 1 = -1 = \text{score}((0, 0, 0)(0, 1, 1))$$

Figure 6:
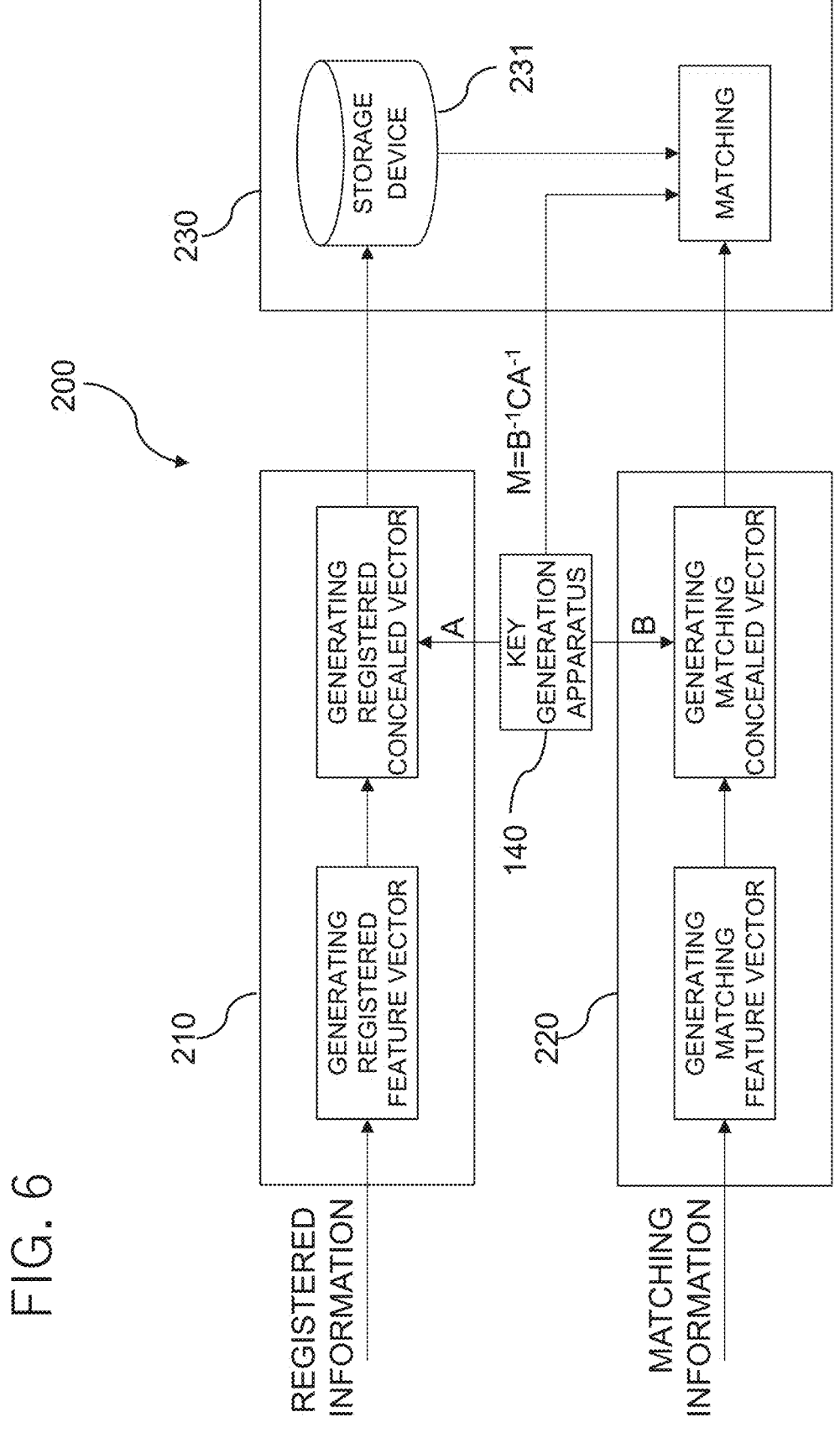
FIG. 6 is a drawing illustrating a schematic configuration of a matching system according to a seventh example embodiment.

A matching system according to the seventh example embodiment uses the above relationship to match registered information with matching information by referring to the score table. FIG. 6 is a drawing illustrating a schematic configuration of a matching system according to the seventh example embodiment. A matching system 200 for the seventh example embodiment has many of the same configurations as the matching system 100 according to the first example embodiment. Therefore, in the description of the matching system 200 according to the seventh example embodiment, explanations are omitted as appropriate. However, the omitted explanations are the same as those of the matching system 100 according to the first example embodiment.

As illustrated in FIG. 6. the matching system 200 uses a key distributed by a key generation apparatus 240 to match a registered information input to a first transformation apparatus 210 and a matching information input to a second transformation apparatus 220 using a matching apparatus 230.

The key generation apparatus 240 generates a first regular matrix of order n (n is a given natural number selected at random) and transmits this first regular matrix to the first transformation apparatus 210 as a registration key matrix A. Further, the key generation apparatus 240 generates a second regular matrix of order n (n is a given natural number selected at random) and transmits this second regular matrix to the second transformation apparatus 220 as a matching key matrix B. Then, the key generation apparatus 240 generates an auxiliary key matrix M from a matrix product of the registration key matrix and the matching key matrix and transmits the auxiliary key matrix to the matching apparatus 230.

The auxiliary key matrix M is a matrix product inserting a score table matrix C between the registration key matrix A and the matching key matrix B, where the score table matrix C is a matrix representation of a score table. That is, the auxiliary key matrix is $M=A^{-1}CB^{-1}$. As explained above, the score table matrix C is configured with diagonally arranged a score table to be referenced.

The first transformation apparatus 210 generates a registered feature vector x' from registered information. The first transformation apparatus 210 represents each component $i \in [0, L]$ in the registered information as an L+1-dimensional vector where the i-th dimension is 1 and the others are 0, as described above. If the registered information itself is a vector, each component is represented by a vector, and the registered feature vector x' is generated by concatenating them.

The first transformation apparatus 210 generates a registered concealed vector by calculating a product of the registered feature vector and the registration key matrix A. The first transformation apparatus 210 transmits the registered concealed vector generated to the matching apparatus 230 and registers it in a storage device 231 in the matching apparatus 230. The storage device 231 may be provided inside the matching apparatus 230, or the storage device 231 may be provided outside the matching apparatus 230.

The second transformation apparatus 220 generates a matching feature vector y' from matching information, as in the case of the registered information described above, and generates a matching concealed vector by calculating a product of the matching feature vector and the matching key matrix B. The second transformation apparatus 220 transmits the matching concealed vector generated to the matching apparatus 230.

The matching apparatus 230 calculates a vector-matrix product in the matching concealed vector, the registered concealed vector and the auxiliary key matrix M. The matching concealed vector is received from the second transformation apparatus 220, and the registered concealed vector is registered in the storage device 231. As for a calculation of the product here, it can calculate $x'^T My'$ for the registered concealed vector x', the auxiliary key matrix M and the matching concealed vector y'. A result of this calculation corresponds with a score (x, y), which is a score of registered information x and the matching information y calculated by referring to the score table incorporated in the score table matrix C.

$$(A^T x')^T M(By') = x'^T$$

$$(AA^{-1}CB^{-1}B)y' = x'^T$$

$$Cy' = <x', Cy'> = \text{score}(x, y)$$

As described above, the matching system 200 for the seventh example embodiment can perform matching of registered information and matching information by referring to the score table. Since the key generation apparatus 240 transmits information on the score table in a form of a matrix product inserting the information on the score table between a registration key matrix A and a matching key matrix B, both of which are selected at random, the information on the score table is substantially encrypted. In other words, registered information and matching information can be matched while the information on the score table itself is also concealed.

In the seventh example embodiment, information on the score table is included only in the auxiliary key matrix M. Therefore, even if there is a plurality of score tables, the same registered concealed vector x' and the matching concealed vector y' can be used for matching using each score table. In other words, even if there is a plurality of score tables, there is no need to store different registered concealed vectors x' for each score table. Even if there is a plurality of score tables, the same registered concealed vector x' and matching concealed vectors and y' need only be calculated for each score table. Therefore, it is possible to generate it in a time independent of the number of score tables.

Next, it is explained that the matching system 200 described above can also update a key in the same manner as the first example embodiment.

Two different regular matrices $\Delta_A$ and $\Delta_B$ selected at random are prepared. For the original registration key matrix A, a new registration key matrix is set to $A\Delta_A$, and for the original matching key matrix B, a new matching key matrix is set to $B\Delta_B$. For the original auxiliary key matrix $M=A^{-1}CB^{-1}$, a new auxiliary key matrix is set to $\Delta_A^{-1} M\Delta_B^{-1}=\Delta_A^{-1}A^{-1}CB^{-1}\Delta_B^{-1}=(A\Delta_A)^{-1}C(\Delta_B B)^{-1}$.

Even with the new registration key matrix $A\Delta_A$ and the new matching key matrix $B\Delta_B$ updated in this way, a calculation result of a vector-matrix product in the registered concealed vector $(A\Delta_A)^T x$, the new auxiliary key matrix $\Delta_A^{-1}M\Delta_B^{-1}$, and the matching concealed vector $\Delta_B By$ will match a score (x, y), which is a score of the registered information x and matching information y calculated by referring to a score table incorporated in a score table matrix C. $((A\Delta_A)^T x')^T(\Delta_A^{-1}M\Delta_B^{-1})(\Delta_B By')=x'^T(A\Delta_A(\Delta_A^{-1}M\Delta_B^{-1})\Delta_B B)y'=x'^T(AMB)y'=x'^T(AA^{-1}CB^{-1}B)y'=x'^TCy'=<x', Cy'>=\text{score}(x, y)$ In addition, the registered concealed vector that has already been registered will be also updated. Concretely, when the registered concealed vector that is concealed using the original registration key matrix A is $A^T x$, an updated registered concealed vector is $\Delta_A{}^T(A^T x')$. The fact that this updated registered concealed vector $\Delta_A{}^T(A^T x')$ is the same as the one concealed using the new registration key matrix $A\Delta_A$ can be understood from the fact that $\Delta_A{}^T(A^T x')=\Delta_A{}^T A^T x'=(A\Delta_A)^T x'$.

Even if matching against the updated registered concealed vector $(A\Delta_A)^T x'$ and the new auxiliary key matrix $\Delta_A{}^{-1}M\Delta_B{}^{-1}$ using the matching concealed vector $By'$, which is generated using the matching key matrix B before updated, score(x, y) cannot be obtained as follows.

$$((A\Delta_A)^T x')^T (\Delta_A{}^{-1}M\Delta_B{}^{-1})(By') = x'^T$$

$$(A\Delta_A\Delta_A{}^{-1}M\Delta_B{}^{-1}B)y' = x'^T$$

$$(AM\Delta_B B)y' = x'^T$$

$$(CB^{-1}\Delta_B B)y' \neq \text{score}(x, y)$$

In the present example embodiment, it is possible to update a key with the auxiliary key matrix M invariant and the registration key matrix A invariant, as in the second example embodiment, the third example embodiment, and the fourth example embodiment.

Eighth Example Embodiment

In the present example embodiment, registered concealed vectors x' and matching concealed vectors y' are extended by vectors having random numbers as elements, thereby increasing security, the same as in the fifth example embodiment.

Concretely, when $(r_1, r_2, \ldots, r_p)$ and $(s_1, s_2, \ldots, s_p)$ are vectors with random numbers as elements, the registered concealed vector x' combined with $(r_1, r_2, \ldots, r_p)$ is denoted as $(x'\|(r_1, r_2, \ldots, r_p))$, and the matching concealed vector y'. combined with $(s_1, s_2, \ldots, s_p)$ is denoted as $(y'\|(s_1, s_2, \ldots, s_p))$. Then, by extending a score table matrix C as follows, dimensions of a registration key matrix and a matching key matrix can be increased while keeping the score value unchanged. This means that the possibility of identifying the registration key matrix and the matching key matrix can be reduced.

$$x'^T \cdot C \cdot y' = (x'^T \| (r_0, \ldots, r_p)) \cdot \begin{pmatrix} C & O^{n \times p} \\ O^{p \times n} & O^{n \times n} \end{pmatrix} \cdot (y'^T \| (s_0, \ldots, s_p))^T \quad \text{[Math 7]}$$

The whole or part of example embodiments disclosed above can be described as, but not limited thereto, the following Supplementary Notes.

[Supplementary Note 1]

A matching system, comprising:

a key generation apparatus that generates a first regular matrix selected at random as a registration key matrix, generates a second regular matrix selected at random as a matching key matrix, and generates an auxiliary key matrix from a matrix product of the registration key matrix and the matching key matrix;

a first transformation apparatus that generates a registered feature vector from registered information input, and generates a registered concealed vector by calculating a product of the registered feature vector and the registration key matrix received from the key generation apparatus;

a second transformation apparatus that generates a matching feature vector from matching information input, and generates a matching concealed vector by calculating a product of the matching feature vector and the matching key matrix received from the key generation apparatus; and a matching apparatus that matches the registered information and the matching information by calculating a vector-matrix product of the registered concealed vector, the matching concealed vector and the auxiliary key matrix, the registered concealed vector being received from the first transformation apparatus, the matching concealed vector being received from the second transformation apparatus, and the auxiliary key matrix being received from the key generation apparatus.

[Supplementary Note 2]

The matching system described in supplementary note 1, wherein the key generation apparatus updates the registration key matrix, the matching key matrix, and the registered concealed vector without changing the auxiliary key matrix.

[Supplementary Note 3]

The matching system described in supplementary note 1, wherein the key generation apparatus updates the matching key matrix and the auxiliary key matrix without changing the registration key matrix.

[Supplementary Note 4]

The matching system described in any one of supplementary notes 1 to 3, wherein the registered feature vector and the matching feature vector are extended by vectors having random numbers as elements.

[Supplementary Note 5]

The matching system described in any one of supplementary notes 1 to 4, wherein the registered feature vector and the matching feature vector are configured such that an inner product of the registered feature vector and the matching feature vector is a square of a Euclidean distance between registered information and the matching information.

[Supplementary Note 6]

The matching system described in any one of supplementary notes 1 to 4, wherein the auxiliary key matrix is obtained from a matrix product inserting a score table matrix between the registration key matrix and the matching key matrix, the score table matrix being a matrix representation of a score table.

[Supplementary Note 7]

The matching system described in supplementary note 6, wherein the registered feature vector and the matching feature vector are vector expressions that each value of feature is transformed to a position where 1 is stored in element.

[Supplementary Note 8]

The matching system described in any one of supplementary notes 1 to 7, wherein the key generation apparatus generates the registration key matrix and the matching key matrix by excluding a non-regular matrix from square matrices in which all elements are assigned with random numbers.

[Supplementary Note 9]

The matching system described in any one of supplementary notes 1 to 8, wherein the matching apparatus comprises a storage device that stores the registered concealed vector received from the first transformation apparatus.

[Supplementary Note 10]

A key generation apparatus that generates a key for matching a registered information and a matching information using a first transformation apparatus, a second transformation apparatus, and a matching apparatus, the first transformation apparatus generating a registered feature vector from the registered information input, and generating a registered concealed vector by calculating a product of the registered feature vector and a registration key matrix received from the key generation apparatus, the second transformation apparatus generating a matching feature vector from the matching information input, and generating a matching concealed vector by calculating a product of the matching feature vector and a matching key matrix received from the key generation apparatus, the matching apparatus calculating a vector-matrix product of the registered concealed vector, the matching concealed vector and an auxiliary key matrix, the registered concealed vector being received from the first transformation apparatus, and the matching concealed vector being received from the second transformation apparatus, wherein the key generation apparatus generates a first regular matrix selected at random as the registration key matrix, generates a second regular matrix selected at random as the matching key matrix, and generates an auxiliary key matrix from a matrix product of the registration key matrix and the matching key matrix.

[Supplementary Note 11]

The key generation apparatus described in supplementary note 10, wherein the key generation apparatus updates the registration key matrix and the matching key matrix without changing the auxiliary key matrix.

[Supplementary Note 12]

The key generation apparatus described in supplementary note 10, wherein the key generation apparatus updates the matching key matrix and the auxiliary key matrix without changing the registration key matrix.

[Supplementary Note 13]

The key generation apparatus described in any one of supplementary notes 10 to 12, wherein the auxiliary key matrix is generated from a matrix product inserting a score table matrix between the registration key matrix and the matching key matrix, the score table matrix being a matrix representation of a score table.

[Supplementary Note 14]

A matching apparatus that matches registered information and matching information using a key generation apparatus, a first transformation apparatus, and a second transformation apparatus, the key generation apparatus generating a registration key, a matching key and an auxiliary key, the first transformation apparatus generating a registered feature vector from the registered information input, and generating a registered concealed vector by calculating a product of the registered feature vector and a registration key matrix received from the key generation apparatus, and the second transformation apparatus generating a matching feature vector from the matching information input, and generating a matching concealed vector by calculating a product of the matching feature vector and a matching key matrix received from the key generation apparatus, wherein the matching apparatus calculates matching result of matching the registered information and the matching information from the registered concealed vector, the matching concealed vector and the auxiliary key matrix, the registered concealed vector being received from the first transformation apparatus, the matching concealed vector being received from the second transformation apparatus, and the auxiliary key matrix being received from the key generation apparatus.

[Supplementary Note 15]

A matching apparatus that matches registered information and matching information using a key generation apparatus, a first transformation apparatus, and a second transformation apparatus, the key generation apparatus generating a first regular matrix selected at random as a registration key matrix, generating a second regular matrix selected at random as a matching key matrix, and generating an auxiliary key matrix from a matrix product of the registration key matrix and the matching key matrix; the first transformation apparatus generating a registered feature vector from the registered information input, and generating a registered concealed vector by calculating a product of the registered feature vector and the registration key matrix received from the key generation apparatus; and the second transformation apparatus generating a matching feature vector from matching information input, and generating a matching concealed vector by calculating a product of the matching feature vector and the matching key matrix received from the key generation apparatus, wherein the matching apparatus matches the registered information and the matching information by calculating a vector-matrix product of the registered concealed vector, the matching concealed vector and the auxiliary key matrix, the registered concealed vector being received from the first transformation apparatus, the matching concealed vector being received from the second transformation apparatus, and the auxiliary key matrix being received from the key generation apparatus.

[Supplementary Note 16]

A first transformation apparatus that registers a registered conceal vector to a matching apparatus for a matching method using a key generation apparatus, a second transformation apparatus, and the matching apparatus, the key generation apparatus generating a first regular matrix selected at random as a registration key matrix, generating a second regular matrix selected at random as a matching key matrix, and generating an auxiliary key matrix from a matrix product of the registration key matrix and the matching key matrix, the second transformation apparatus generating a matching feature vector from matching information input, and generating a matching concealed vector by calculating a product of the matching feature vector and the matching key matrix received from the key generation apparatus, the matching apparatus calculating a vector-matrix product of the matching concealed vector a registered concealed vector, and the auxiliary key matrix, the matching concealed vector being received from the second transformation apparatus and the auxiliary key matrix being received from the key generation apparatus, wherein the first transformation apparatus generates a registered feature vector from the registered information input, generates the registered concealed vector by calculating a product of the registered feature vector and the registration key matrix received from the key generation apparatus, and transmits the registered concealed vector to the matching apparatus.

[Supplementary Note 17]

A second transformation apparatus that transmits a matching concealed vector to a matching apparatus for a matching method using a key generation apparatus, a first transformation apparatus, and the matching apparatus, the key generation apparatus generating a first regular matrix selected at random as a registration key matrix, generating a second regular matrix selected at random as a matching key matrix, and generating an auxiliary key matrix from a matrix product of the registration key matrix and the matching key matrix, the first transformation apparatus generating a registered feature vector from the registered information input, and generating a registered concealed vector by calculating a product of the registered feature vector and the registration key matrix received from the key generation apparatus, the matching apparatus calculating a vector-matrix product of the registered concealed vector, the matching concealed vector input and the auxiliary key matrix, the registered concealed vector being received from the first transformation apparatus and the auxiliary key matrix being received from the key generation apparatus, wherein the second transformation apparatus generates a matching feature vector from matching information input, generates the matching concealed vector by calculating a product of the matching feature vector and the matching key matrix received from the key generation apparatus, and transmits the matching concealed vector to the matching apparatus.

[Supplementary Note 18]

A method for matching registered information input to a first transformation apparatus and matching information input to a second transformation apparatus using a key distributed by a key generation apparatus, comprising:

generating a first regular matrix selected at random as a registration key matrix by the key generation apparatus;

generating a second regular matrix selected at random as a matching key matrix by the key generation apparatus;

generating an auxiliary key matrix from a matrix product of the registration key matrix and the matching key matrix by the key generation apparatus;

generates a registered feature vector from registered information input by the first transformation apparatus;

generating a registered concealed vector by calculating a product of the registered feature vector and the registration key matrix received from the key generation apparatus by the first transformation apparatus;

generating a matching feature vector from matching information input by the second transformation apparatus;

generating a matching concealed vector by calculating a product of the matching feature vector and the matching key matrix received from the key generation apparatus by the second transformation apparatus; and matching the registered information and the matching information by calculating a vector-matrix product of the registered concealed vector, the matching concealed vector and the auxiliary key matrix by the matching apparatus.

[Supplementary Note 19]

A key generation method for matching registered information and matching information using a first transformation apparatus, a second transformation apparatus, and a matching apparatus, the first transformation apparatus generating a registered feature vector from the registered information input, and generating a registered concealed vector by calculating a product of the registered feature vector and a registration key matrix received from the key generation apparatus, the second transformation apparatus generating a matching feature vector from the matching information input, and generating a matching concealed vector by calculating a product of the matching feature vector and a matching key matrix received from the key generation apparatus, the matching apparatus calculating a vector-matrix product of the registered concealed vector, the matching concealed vector and an auxiliary key matrix, the registered concealed vector being received from the first transformation apparatus, and the matching concealed vector being received from the second transformation apparatus, wherein the key generation method comprises:

generating a first regular matrix selected at random as the registration key matrix, generating a second regular matrix selected at random as the matching key matrix, and generating the auxiliary key matrix from a matrix product of the registration key matrix and the matching key matrix.

[Supplementary Note 20]

A matching method for matching registered information and matching information using a key generation apparatus, a first transformation apparatus, and a second transformation apparatus, the key generation apparatus generating a first regular matrix selected at random as a registration key matrix, generating a second regular matrix selected at random as a matching key matrix, and generating an auxiliary key matrix from a matrix product of the registration key matrix and the matching key matrix; the first transformation apparatus generating a registered feature vector from the registered information input, and generating a registered concealed vector by calculating a product of the registered feature vector and the registration key matrix received from the key generation apparatus; and the second transformation apparatus generating a matching feature vector from matching information input, and generating a matching concealed vector by calculating a product of the matching feature vector and the matching key matrix received from the key generation apparatus, wherein the matching method comprises:

matching the registered information and the matching information by calculating a vector-matrix product of the registered concealed vector, the matching concealed vector and the auxiliary key matrix, the registered concealed vector being received from the first transformation apparatus, the matching concealed vector being received from the second transformation apparatus, and the auxiliary key matrix being received from the key generation apparatus.

[Supplementary Note 21]

A first transformation method for registering a registered conceal vector to a matching apparatus for a matching method using a key generation apparatus, a second transformation apparatus, and the matching apparatus, the key generation apparatus generating a first regular matrix selected at random as a registration key matrix, generating a second regular matrix selected at random as a matching key matrix, and generating an auxiliary key matrix from a matrix product of the registration key matrix and the matching key matrix, the second transformation apparatus generating a matching feature vector from matching information input, and generating a matching concealed vector by calculating a product of the matching feature vector and the matching key matrix received from the key generation apparatus, the matching apparatus calculating a vector-matrix product of the matching concealed vector a registered concealed vector, and the auxiliary key matrix, the matching concealed vector being received from the second transformation apparatus and the auxiliary key matrix being received from the key generation apparatus, wherein the first transformation method comprises:

generating a registered feature vector from the registered information input, generating the registered concealed vector by calculating a product of the registered feature vector and the registration key matrix received from the key generation apparatus, and transmitting the registered concealed vector to the matching apparatus.

[Supplementary Note 22]

A second transformation method for transmitting a matching concealed vector to a matching apparatus for a matching method using a key generation apparatus, a first transformation apparatus, and the matching apparatus, the key generation apparatus generating a first regular matrix selected at random as a registration key matrix, generating a second regular matrix selected at random as a matching key matrix, and generating an auxiliary key matrix from a matrix product of the registration key matrix and the matching key matrix, the first transformation apparatus generating a registered feature vector from the registered information input, and generating a registered concealed vector by calculating a product of the registered feature vector and the registration key matrix received from the key generation apparatus, the matching apparatus calculating a vector-matrix product of the registered concealed vector, the matching concealed vector input and the auxiliary key matrix, the registered concealed vector being received from the first transformation apparatus and the auxiliary key matrix being received from the key generation apparatus, wherein the second transformation method comprises:

generating a matching feature vector from matching information input, generating the matching concealed vector by calculating a product of the matching feature vector and the matching key matrix received from the key generation apparatus, and transmitting the matching concealed vector to the matching apparatus.

Further, the disclosure of Patent Literature cited above is incorporated herein in its entirety by reference thereto. It is to be noted that it is possible to modify or adjust the example embodiments or examples within the scope of the whole disclosure of the present invention (including the Claims) and based on the basic technical concept thereof. Further, it is possible to variously combine or select (or partially omit) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the Claims and the technical concept of the present invention. Particularly, any numerical ranges disclosed herein should be interpreted that any intermediate values or subranges falling within the disclosed ranges are also concretely disclosed even without specific recital thereof. In addition, using some or all of the disclosed matters in the literatures cited above as necessary, in combination with the matters described herein, as part of the disclosure of the present invention in accordance with the object thereof shall be considered to be included in the disclosed matters of the present application.

REFERENCE SIGNS LIST

10: hardware configuration
11: CPU
12: main storage device
13: auxiliary storage device
14: IF
100,200: matching system
110,210: first transformation apparatus
120,220: second transformation apparatus
130,230: matching apparatus
131,231: storage device
140,240: key generation apparatus

What is claimed is:

1. A matching system, comprising:
a key generation apparatus that generates a first regular matrix selected at random as a registration key matrix, generates a second regular matrix selected at random as a matching key matrix, and generates an auxiliary key matrix from a matrix product of the registration key matrix and the matching key matrix;
a first transformation apparatus that generates a registered feature vector from registered information input, and generates a registered concealed vector by calculating a product of the registered feature vector and the registration key matrix received from the key generation apparatus;
a second transformation apparatus that generates a matching feature vector from matching information input, and generates a matching concealed vector by calculating a product of the matching feature vector and the matching key matrix received from the key generation apparatus; and
a matching apparatus that matches the registered information and the matching information by calculating a vector-matrix product of the registered concealed vector, the matching concealed vector and the auxiliary key matrix, the registered concealed vector being received from the first transformation apparatus, the matching concealed vector being received from the second transformation apparatus, and the auxiliary key matrix being received from the key generation apparatus.

2. The matching system according to claim 1, wherein the key generation apparatus updates the registration key matrix, the matching key matrix, and the registered concealed vector without changing the auxiliary key matrix.

3. The matching system according to claim 1, wherein the key generation apparatus updates the matching key matrix and the auxiliary key matrix without changing the registration key matrix.

4. The matching system according to claim 1, wherein the registered feature vector and the matching feature vector are extended by vectors having random numbers as elements.

5. The matching system according to claim 1, wherein the registered feature vector and the matching feature vector are configured such that an inner product of the registered feature vector and the matching feature vector is a square of a Euclidean distance between the registered information and the matching information.

6. The matching system according to claim 1, wherein the auxiliary key matrix is obtained from a matrix product inserting a score table matrix between the registration key matrix and the matching key matrix, the score table matrix being a matrix representation of a score table.

7. The matching system according to claim 6, wherein the registered feature vector and the matching feature vector are vector expressions that each value of feature is transformed to a position where 1 is stored in element.

8. The matching system according to claim 1, wherein the key generation apparatus generates the registration key matrix and the matching key matrix by excluding a non-regular matrix from square matrices in which all elements are assigned with random numbers.

9. The matching system according to claim 1, wherein the matching apparatus comprises a storage device that stores the registered concealed vector received from the first transformation apparatus.

10. A key generation apparatus that generates a key for matching a registered information and a matching information using a first transformation apparatus, a second transformation apparatus, and a matching apparatus, wherein the first transformation apparatus is configured to generate a registered feature vector from the registered information input, and to generate a registered concealed vector by calculating a product of the registered feature vector and a registration key matrix received from the key generation apparatus, wherein the second transformation apparatus generates a matching feature vector from the matching information input, and generates a matching concealed vector by calculating a product of the matching feature vector and a matching key matrix received from the key generation apparatus, wherein the matching apparatus calculates a vector-matrix product of the registered concealed vector, the matching concealed vector and an auxiliary key matrix, the registered concealed vector being received from the first transformation apparatus, and the matching concealed vector being received from the second transformation apparatus, wherein the key generation apparatus is configured to generate a first regular matrix selected at random as the registration key matrix, to generate a second regular matrix selected at random as the matching key matrix, and to generate an auxiliary key matrix from a matrix product of the registration key matrix and the matching key matrix.

11. The key generation apparatus according to claim 10, wherein the key generation apparatus updates the registration key matrix and the matching key matrix without changing the auxiliary key matrix.

12. The key generation apparatus according to claim 10, wherein the key generation apparatus updates the matching key matrix and the auxiliary key matrix without changing the registration key matrix.

13. The key generation apparatus according to claim 10, wherein the auxiliary key matrix is generated from a matrix product inserting a score table matrix between the registration key matrix and the matching key matrix, the score table matrix being a matrix representation of a score table.

14. A method for matching registered information input to a first transformation apparatus and matching information input to a second transformation apparatus using a key distributed by a key generation apparatus, comprising:

generating a first regular matrix selected at random as a registration key matrix by the key generation apparatus;

generating a second regular matrix selected at random as a matching key matrix by the key generation apparatus;

generating an auxiliary key matrix from a matrix product of the registration key matrix and the matching key matrix by the key generation apparatus;

generates a registered feature vector from registered information input by the first transformation apparatus;

generating a registered concealed vector by calculating a product of the registered feature vector and the registration key matrix received from the key generation apparatus by the first transformation apparatus;

generating a matching feature vector from matching information input by the second transformation apparatus;

generating a matching concealed vector by calculating a product of the matching feature vector and the matching key matrix received from the key generation apparatus by the second transformation apparatus; and matching the registered information and the matching information by calculating a vector-matrix product of the registered concealed vector, the matching concealed vector and the auxiliary key matrix by the matching apparatus.

15. The method for matching registered information input to the first transformation apparatus and matching information input to the second transformation apparatus using the key distributed by a key generation apparatus according to claim 14, wherein the key generation apparatus updates the registration key matrix, the matching key matrix, and the registered concealed vector without changing the auxiliary key matrix.

16. The method for matching registered information input to the first transformation apparatus and matching information input to the second transformation apparatus using the key distributed by a key generation apparatus according to claim 14, wherein the key generation apparatus updates the matching key matrix and the auxiliary key matrix without changing the registration key matrix.

17. The method for matching registered information input to the first transformation apparatus and matching information input to the second transformation apparatus using the key distributed by a key generation apparatus according to claim 14, wherein the registered feature vector and the matching feature vector are extended by vectors having random numbers as elements.

18. The method for matching registered information input to the first transformation apparatus and matching information input to the second transformation apparatus using the key distributed by a key generation apparatus according to claim 14, wherein the registered feature vector and the matching feature vector are configured such that an inner product of the registered feature vector and the matching feature vector is a square of a Euclidean distance between the registered information and the matching information.

19. The method for matching registered information input to the first transformation apparatus and matching information input to the second transformation apparatus using the key distributed by a key generation apparatus according to claim 14, wherein the auxiliary key matrix is obtained from a matrix product inserting a score table matrix between the registration key matrix and the matching key matrix, the score table matrix being a matrix representation of a score table.

20. The method for matching registered information input to the first transformation apparatus and matching information input to the second transformation apparatus using the key distributed by a key generation apparatus according to claim 14, wherein the key generation apparatus generates the registration key matrix and the matching key matrix by excluding a non-regular matrix from square matrices in which all elements are assigned with random numbers.

* * * * *